(12) United States Patent
Shiromoto et al.

(10) Patent No.: US 10,640,639 B2
(45) Date of Patent: May 5, 2020

(54) POLYMER AND ASPHALT COMPOSITION

(71) Applicant: Asahi Kasei Kabushiki Kaisha, Tokyo (JP)

(72) Inventors: Takayuki Shiromoto, Tokyo (JP); Shigeo Nakajima, Tokyo (JP); Yoshifumi Araki, Tokyo (JP); Takuya Suzuki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 918 days.

(21) Appl. No.: 15/111,892

(22) PCT Filed: Jan. 16, 2015

(86) PCT No.: PCT/JP2015/051096
§ 371 (c)(1),
(2) Date: Jul. 15, 2016

(87) PCT Pub. No.: WO2015/108150
PCT Pub. Date: Jul. 23, 2015

(65) Prior Publication Data
US 2019/0153214 A1    May 23, 2019

(30) Foreign Application Priority Data

| Jan. 17, 2014 | (JP) | 2014-007293 |
| Apr. 17, 2014 | (JP) | 2014-085364 |
| Oct. 1, 2014 | (JP) | 2014-203037 |
| Oct. 1, 2014 | (JP) | 2014-203038 |
| Nov. 17, 2014 | (JP) | 2014-232736 |
| Nov. 17, 2014 | (JP) | 2014-232737 |

(51) Int. Cl.
*C08L 53/02* (2006.01)
*C08L 95/00* (2006.01)
*C08F 297/04* (2006.01)
*E01C 7/26* (2006.01)

(52) U.S. Cl.
CPC ........ *C08L 53/025* (2013.01); *C08F 297/04* (2013.01); *C08L 53/02* (2013.01); *C08L 95/00* (2013.01); *E01C 7/265* (2013.01); *C08L 2555/22* (2013.01); *C08L 2555/54* (2013.01); *C08L 2555/80* (2013.01); *C08L 2555/84* (2013.01)

(58) Field of Classification Search
CPC .... C08L 53/02; C08L 53/025; C08L 2555/84; C08F 297/04
See application file for complete search history.

(56) References Cited

U.S. PATENT DOCUMENTS

| 4,145,322 A | 3/1979 | Maldonado et al. |
| 6,120,913 A | 9/2000 | Kluttz et al. |
| 2003/0149140 A1 | 8/2003 | Stephens et al. |
| 2005/0004273 A1 | 1/2005 | Chun et al. |
| 2005/0107521 A1 | 5/2005 | Sasagawa et al. |
| 2006/0178485 A1 | 8/2006 | Shimakage et al. |
| 2011/0196073 A1 | 8/2011 | Fee et al. |

FOREIGN PATENT DOCUMENTS

| EP | 0360656 B1 | 1/1994 |
| JP | S57-024385 B2 | 5/1982 |
| JP | H03-501035 A | 3/1991 |
| JP | H08-157547 A | 6/1996 |
| JP | H09-302234 A | 11/1997 |
| JP | 2003-055560 A | 2/2003 |
| JP | 2004-300408 A | 10/2004 |
| JP | 2005-126485 A | 5/2005 |
| JP | 2006-160886 A | 6/2006 |
| JP | 2011-246648 A | 12/2011 |
| JP | 2012-246378 A | 12/2012 |
| KR | 2003-0046053 A | 6/2003 |
| KR | 2005-0109993 A | 11/2005 |
| WO | 2009/133930 A1 | 11/2009 |

OTHER PUBLICATIONS

International Search Report issued in corresponding International Patent Application No. PCT/JP2015/051096 dated Mar. 31, 2015.
International Preliminary Report on Patentability issued in corresponding International Patent Application No. PCT/JP2015/051096 dated Jul. 19, 2016.
Search Report issued in counterpart European Patent Application No. 15736980.2 dated Feb. 1, 2017.

*Primary Examiner* — Jeffrey C Mullis
(74) *Attorney, Agent, or Firm* — Morgan, Lewis & Bockius LLP

(57) ABSTRACT

The present invention provides a polymer comprising conjugated diene monomer units and vinyl aromatic monomer units, wherein
the polymer has a polymer block (A) comprising principally vinyl aromatic monomer units, and a polymer block (B) comprising conjugated diene monomer units and vinyl aromatic monomer units, and
has a Bragg spacing of 27 nm or larger and 50 nm or smaller.

19 Claims, No Drawings

POLYMER AND ASPHALT COMPOSITION

TECHNICAL FIELD

The present invention relates to a polymer and an asphalt composition.

BACKGROUND ART

Heretofore, asphalt compositions have been widely used in applications such as road pavement, waterproof sheets, sound isolation sheets, and roofings. In this respect, many attempts have been made to improve the properties of asphalt by adding various polymers to the asphalt.

For example, ethylene-vinyl acetate copolymers, ethylene-ethyl acrylate copolymers, rubber latexes, and block copolymers consisting of conjugated diene and vinyl aromatic hydrocarbon are used as the polymers.

In recent years, there has been a growing demand for asphalt compositions having excellent strength and abrasion resistance associated with circumstances such as increase in the number of vehicles passing through roads or their speedup. This requires a higher softening point and mechanical strength such as elongation and modulus. Thus, attempts have been made to improve these properties, for example, by increasing the molecular weights of block copolymers for use as the polymers mentioned above. Such a method, however, tends to deteriorate workability.

Therefore, attempts have generally been made to raise the softening points of asphalt compositions by adding an aromatic oil or by performing cross-linking by the addition of sulfur or peroxide.

For example, Patent Document 1 discloses use of a binder containing a sulfur-donating compound.

Patent Document 2 discloses an asphalt composition containing a copolymer consisting of conjugated diene having a specific structure and vinyl aromatic hydrocarbon.

Patent Document 3 discloses an asphalt composition for roofing singles containing a block copolymer consisting of vinyl aromatic hydrocarbon and conjugated diene, and a filler.

Patent Document 4 discloses an asphalt composition containing a copolymer consisting of conjugated diene having a specific structure and vinyl aromatic hydrocarbon.

LIST OF PRIOR ART DOCUMENTS

Patent Document

Patent Document 1: Japanese Patent Laid-Open No. 3-501035
Patent Document 2: U.S. Patent Publication No. 2003/0149140
Patent Document 3: U.S. Pat. No. 6,120,913
Patent Document 4: Japanese Patent Laid-Open No. 9-302234

SUMMARY OF INVENTION

Problems to be Solved by Invention

The method disclosed in Patent Document 1, however, still fails to produce a sufficiently high softening point. Further improvement therein has been desired.

The asphalt composition disclosed in Patent Document 2 also still fails to have a sufficiently high softening point. Further improvement therein has been desired.

The asphalt compositions disclosed in Patent Documents 3 and 4 employs a block copolymer consisting of normal vinyl aromatic hydrocarbon and conjugated diene. Therefore, further improvement in softening point and workability has been desired.

Thus, an object of the present invention is to provide a polymer that offers a high softening point and excellent workability of an asphalt composition.

Means for Solving Problems

To attain the object, the present inventors have conducted diligent studies on improvement in the characteristics of an asphalt composition comprising a polymer and asphalt, and consequently completed the present invention by finding that an asphalt composition comprising a polymer having a specific structure has a high softening point and excellent workability.

Specifically, the present invention is as follows.

[1]
A polymer comprising a conjugated diene monomer unit and a vinyl aromatic monomer unit, wherein
the polymer has a polymer block (A) comprising principally a vinyl aromatic monomer unit, and a polymer block (B) comprising a conjugated diene monomer unit and a vinyl aromatic monomer unit, and
has a Bragg spacing of 27 nm or larger and 50 nm or smaller.
[2]
The polymer according to [1], wherein a rate of hydrogenation of a double bond in the conjugated diene monomer unit is 0 mol % or higher and 90 mol % or lower.
[3]
The polymer according to [1] or [2], wherein the rate of hydrogenation of the double bond in the conjugated diene monomer unit is 50 mol % or higher and 90 mol % or lower.
[4]
The polymer according to [1], wherein the rate of hydrogenation of the double bond in the conjugated diene monomer unit exceeds 90 mol %.
[5]
The polymer according to any one of [1] to [4], wherein
the polymer has a peak top of loss tangent in the range of −55 to −10° C. in a dynamic viscoelastic spectrum, and
a value of the peak top is 0.7 or higher and 2.0 or lower.
[6]
The polymer according to [5], wherein
the polymer has the peak top of loss tangent in the range of −55 to −10° C. in a dynamic viscoelastic spectrum, and
the value of the peak top is 0.7 or higher and 1.5 or lower.
[7]
The polymer according to any one of [1] to [6], wherein a content of the vinyl aromatic monomer unit is 20% by mass or larger and 60% by mass or smaller.
[8]
The polymer according to any one of [1] to [7], wherein the content of the polymer block (A) is 10% by mass or larger and 40% by mass or smaller.
[9]
The polymer according to any one of [1] to [8], wherein the content of a short-chain vinyl aromatic monomer-polymerized moiety comprising 2 to 6 vinyl aromatic monomer units in the polymer block (B) is 50% by mass or larger based on the content of the vinyl aromatic monomer unit in the polymer block (B) defined as 100% by mass.

[10]

The polymer according to [9], wherein a content of a short-chain vinyl aromatic monomer-polymerized moiety in the polymer block (B) is 70% by mass or larger based on the content of the vinyl aromatic monomer unit in the polymer block (B) defined as 100% by mass.

[11]

The polymer according to any one of [1] to [10], wherein the conjugated diene monomer unit consist of a conjugated diene monomer unit (a) derived from 1,2-bond and/or 3,4-bond and a conjugated diene monomer unit (b) derived from 1,4-bond, and when a total content of the conjugated diene monomer unit is defined as 100% by mass, a content of an alkenyl monomer unit (a1) with the conjugated diene monomer unit (a) hydrogenated is 10% by mass or larger and 50% by mass or smaller, a content of an alkenyl monomer unit (b1) with the conjugated diene monomer unit (b) hydrogenated is 0% by mass or larger and 80% by mass or smaller, and the sum of the contents of an unhydrogenated conjugated diene monomer unit (a) and an unhydrogenated conjugated diene monomer unit (b) after hydrogenation is 0% by mass or larger and 90% by mass or smaller.

[12]

The polymer according to any one of [1] to [11], wherein the polymer has a weight-average molecular weight of 50000 or higher and 400000 or lower.

[13]

The polymer according to any one of [1] to [12], wherein the content of the conjugated diene monomer unit (a) derived from 1,2-bond and/or 3,4-bond is 10 mol % or higher and 50 mol % or lower based on the total content of the conjugated diene monomer unit.

[14]

The polymer according to any one of [1] to [13], wherein the polymer has a functional group.

[15]

An asphalt composition comprising 0.5 parts by mass or more and 50 parts by mass or less of the polymer according to any one of [1] to [14] and 100 parts by mass of asphalt.

[16]

An asphalt composition comprising 0.5 parts by mass or more and 50 parts by mass or less in total of the polymer according to any one of [1] to [14] and a block copolymer (α), and 100 parts by mass of asphalt, wherein the block copolymer (α) has at least one polymer block (A) comprising principally a vinyl aromatic monomer unit, and at least one polymer block (C) comprising principally a conjugated diene monomer unit, and a content of the block copolymer (α) is 15 to 85% by mass in the total amount of the polymer according to any one of [1] to [14] and block copolymer X.

[17]

The asphalt composition according to [15] or [16], further comprising 0.03 parts by mass or more and 3 parts by mass or less of sulfur and/or a sulfur compound based on 100 parts by mass of the asphalt.

Advantages of Invention

The polymer of the present invention offers a high softening point and excellent workability of an asphalt composition.

Mode for Carrying Out Invention

Hereinafter, a mode for carrying out the present invention (hereinafter, referred to as the "present embodiment") will be described in detail.

The present invention is not intended to be limited by the present embodiment given below. Various changes or modifications can be made in the present embodiment without departing from the spirit of the present invention.

[Polymer]

The polymer of the present embodiment is a polymer comprising conjugated diene monomer units and vinyl aromatic monomer units, wherein the polymer has a polymer block (A) comprising principally vinyl aromatic monomer units, and a polymer block (B) comprising conjugated diene monomer units and vinyl aromatic monomer units, and has a Bragg spacing of 27 nm or larger and 50 nm or smaller.

In the polymer of the present embodiment, the conjugated diene monomer unit is a unit per conjugated diene compound resulting from the polymerization of a conjugated diene compound.

The conjugated diene compound is a diolefin having a pair of conjugated double bonds. Examples of the conjugated diene compound include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

Among them, 1,3-butadiene and isoprene are preferred. Only one of these conjugated diene compounds may be used, or two or more thereof may be used in combination.

In the polymer of the present embodiment, the vinyl aromatic monomer unit is a unit per vinyl aromatic compound resulting from the polymerization of a vinyl aromatic compound.

Examples of the vinyl aromatic compound include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene.

Only one of these vinyl aromatic compounds may be used, or two or more thereof may be used in combination.

In the polymer of the present embodiment, the polymer block (A) is a block comprising principally vinyl aromatic monomer units.

In this context, the phrase "comprising principally vinyl aromatic monomer units" means that the polymer block (A) comprises 60% by mass or larger, preferably 80% by mass or larger, more preferably 90% by mass or larger, even more preferably 95% by mass or larger, of the vinyl aromatic monomer units. The upper limit is not particularly limited and is preferably 100% by mass or smaller, more preferably 99% by mass or smaller.

The amount of the vinyl aromatic monomer units contained in the polymer block (A) is preferably larger than 95% by mass and 100% by mass or smaller, more preferably 96% by mass or larger and 100% by mass or smaller, even more preferably 97% by mass or larger and 100% by mass or smaller.

The content of the polymer block (A) in the polymer of the present embodiment is preferably 10% by mass or larger and 40% by mass or smaller based on 100% by mass of the polymer of the present embodiment.

When the content of the polymer block (A) in the polymer of the present embodiment falls within the range described above, an asphalt composition having a high softening point is obtained.

The content of the polymer block (A) is preferably 10% by mass or larger, more preferably 13% by mass or larger, even more preferably 16% by mass or larger, further preferably 17% by mass or larger, based on 100% by mass of the polymer of the present embodiment from the viewpoint of a high softening point, recovery after tension, and resistance to aggregate spalling.

Also, the content of the polymer block (A) is preferably 40% by mass or smaller, more preferably 35% by mass or smaller, even more preferably 30% by mass or smaller, further preferably 29% by mass or smaller, still further preferably 23% by mass or smaller, particularly preferably 22% by mass or smaller, from the viewpoint of the flexibility and high-temperature storage stability of the polymer of the present embodiment and an asphalt composition, and resistance to aggregate spalling.

The content of the polymer block (A) in the polymer of the present embodiment is preferably 15% by mass or larger and 35% by mass or smaller, more preferably 20% by mass or larger and 30% by mass or smaller, from the viewpoint of the softening point and high-temperature storage stability of an asphalt composition.

The aforementioned content of the polymer block (A) in the polymer of the present embodiment can be determined according to the following expression using the mass of the vinyl aromatic polymer block component (except for a vinyl aromatic polymer block component having an average degree of polymerization of approximately 30 or less) determined by, for example, a method for oxidatively decomposing the polymer with tertiary butyl hydroperoxide using osmium tetroxide as a catalyst (method described in I. M. KOLTHOFF, et al., J. Polym. Sci., 1, p. 429 (1946)):

Content of the polymer block (A) (% by mass)= (Mass of the vinyl aromatic polymer block component/Mass of the polymer)×100

The polymer of the present embodiment may be hydrogenated. In the case of the hydrogenated polymer, the content of the polymer block (A) in the hydrogenated polymer is almost equal to the content of the polymer block (A) in the polymer before hydrogenation. Therefore, in the present embodiment, the content of the polymer block (A) in the hydrogenated polymer may be determined as the content of the polymer block (A) before hydrogenation.

In the polymer of the present embodiment, the polymer block (B) is a block comprising conjugated diene monomer units and vinyl aromatic monomer units. The content of the vinyl aromatic monomer units in the polymer block (B) is preferably 10% by mass or larger and smaller than 60% by mass. The content of the vinyl aromatic monomer units in the polymer block (B) is more preferably 10% by mass or larger and 50% by mass or smaller, even more preferably 12% by mass or larger and 40% by mass or smaller.

The content of the vinyl aromatic monomer units contained in the copolymer block (B) comprising conjugated diene monomer units and vinyl aromatic monomer units in the polymer of the present embodiment is preferably 10% by mass or larger, more preferably 20% by mass or larger, even more preferably 25% by mass or larger, from the viewpoint of high-temperature storage stability, softening point, dispersibility, separation stability, heat aging resistance, and recovery after tension.

Also, the content of the vinyl aromatic monomer units is preferably 50% by mass or smaller, more preferably 40% by mass or smaller, even more preferably 35% by mass or smaller, further preferably 30% by mass or smaller, from the viewpoint of a low amount of the polymer added to asphalt, the separation stability of an asphalt composition, the flexibility of an asphalt composition or the polymer, weather resistance, resistance to aggregate spalling, viscosity, and dispersibility.

The polymer block (B) is preferably a random block. In this context, the term "random" refers to the state in which the number of consecutive vinyl aromatic monomer units in the block polymer is 10 or less.

The content of the polymer block (B) in the polymer of the present embodiment is preferably 60% by mass or larger and 90% by mass or smaller based on 100% by mass of the polymer.

When the content of the polymer block (B) in the polymer of the present embodiment falls within the range described above, the polymer of the present embodiment has excellent solubility in an asphalt composition. The content of the polymer block (B) in the polymer is more preferably 65% by mass or larger and 85% by mass or smaller, even more preferably 70% by mass or larger and 80% by mass or smaller, from the viewpoint of the softening point of an asphalt composition.

The percentage of blocking in the polymer of the present embodiment is preferably 16.6% or more and 96.5% or less, more preferably 20% or more and 90% or less, even more preferably 25% or more and 85% or less.

The percentage of blocking can be calculated according to the following expression using values of the content of the vinyl aromatic monomer units (styrene content) in the polymer and the content of the polymer block (A) in the polymer as mentioned later in Examples:

Content of the polymer block (A) in the polymer/ Content of the vinyl aromatic monomer units in the polymer×100(%)

The percentage of blocking is preferably in the numeric range described above from the viewpoint of the balance between softening point and dispersibility.

The content (RS) of the vinyl aromatic monomer units in the copolymer block (B) in the polymer of the present embodiment can be determined by subtracting the content (BS) of the block (A) comprising principally vinyl aromatic monomer units described above from the content (TS) of the vinyl aromatic monomer units in the polymer.

Specifically, the content (RS) can be determined according to RS (% by mass)=(TS−BS)/(100−BS)×100.

The content of the vinyl aromatic monomer units in the polymer of the present embodiment is preferably 20% by mass or larger and 60% by mass or smaller based on the mass of the polymer of the present embodiment.

When the content of the vinyl aromatic monomer units in the polymer falls within the range described above, an asphalt composition excellent in softening point and elongation is obtained.

The content of the vinyl aromatic monomer units in the polymer of the present embodiment is preferably 20% by mass or larger, more preferably 25% by mass or larger, even more preferably 33% by mass or larger, further preferably 37% by mass or larger, still further preferably 40% by mass or larger, from the viewpoint of the softening point, elongation, high-temperature storage stability, separation stability, heat aging resistance, recovery after tension, and resistance to aggregate spalling of an asphalt composition.

Also, the content of the vinyl aromatic monomer units is preferably 60% by mass or smaller, more preferably 55% by mass or smaller, even more preferably 50% by mass or smaller, further preferably 48% by mass or smaller, still further preferably 45% by mass or smaller, from the viewpoint of the elongation, flexibility, separation stability, flexibility, recovery after tension, and resistance to aggregate spalling of an asphalt composition.

The content of the vinyl aromatic monomer units in the polymer of the present embodiment is preferably 25% by mass or larger and 55% by mass or smaller, more preferably 30% by mass or larger and 55% by mass or smaller, even more preferably 30% by mass or larger and 50% by mass or smaller, from the viewpoint of the balance between softening point and elongation of an asphalt composition.

The content of the vinyl aromatic monomer units in the polymer of the present embodiment can be measured by a method described in Examples mentioned later.

In the case of the hydrogenated polymer of the present embodiment, the content of the vinyl aromatic monomer units in the hydrogenated polymer is almost equal to the content of the vinyl aromatic monomer units in the polymer before hydrogenation. Therefore, the content of the vinyl aromatic monomer units in the hydrogenated polymer may be determined as the content of the vinyl aromatic monomer units before hydrogenation.

In the polymer of the present embodiment, the rate of hydrogenation (mol %), which represents the content of hydrogenated conjugated diene monomer units in the total content of the conjugated diene monomer units, i.e., the rate of hydrogenation of double bonds in the conjugated diene monomer units, is preferably 0 mol % or higher and 90 mol % or lower from the viewpoint of a shortened dissolution time and viscosity. In this case, the polymer of the present embodiment is an unhydrogenated polymer, or 90 mol % or less of the conjugated diene monomer units in the total content thereof are hydrogenated.

The polymer of the present embodiment is preferably unhydrogenated from the viewpoint of the elongation of an asphalt composition.

On the other hand, the polymer of the present embodiment is preferably hydrogenated from the viewpoint of high-temperature storage stability and UV resistance.

In the case of the hydrogenated polymer of the present embodiment, the rate of hydrogenation is preferably 30 mol % or higher and 90 mol % or lower, more preferably 40 mol % or higher and 90 mol % or lower, from the viewpoint of a shortened dissolution time. The rate of hydrogenation is preferably 50 mol % or higher and 90 mol % or lower, more preferably 60 mol % or higher and 90 mol % or lower, from the viewpoint of penetration and recovery after tension.

The rate of hydrogenation in the polymer is preferably 90 mol % or lower, more preferably 88 mol % or lower, even more preferably 86 mol % or lower, further preferably 85 mol % or lower, from the viewpoint of decreasing the viscosity of an asphalt composition.

Also, the rate of hydrogenation in the polymer is preferably higher than 90 mol %, more preferably 93 mol % or higher, even more preferably 95 mol % or higher, further preferably 97 mol % or higher, from the viewpoint of reduction in the amount of the polymer added in the addition of the polymer of the present embodiment to asphalt, recovery after tension, high heat aging resistance during storage, and resistance to aggregate spalling. The upper limit is not particularly limited and is preferably 100 mol % or lower.

The upper limit is preferably 98 mol % or lower, more preferably 96 mol % or lower, even more preferably 93 mol % or lower, from the viewpoint of viscosity.

The rate of hydrogenation of double bonds in the conjugated diene monomer units in the polymer of the present embodiment can be determined by a method described in Examples mentioned later.

Preferably, the polymer of the present embodiment has a peak top of loss tangent (tan δ) in the range of −70 to 0° C. in a dynamic viscoelastic spectrum, and the value of the peak top is 0.7 or higher and 2.0 or lower.

The peak top of loss tangent (tan δ) is more preferably present in the range of −55 to −10° C., even more preferably in the range of −55 to −15° C., further preferably in the range of −55 to −20° C., still further preferably in the range of −55 to −25° C., from the viewpoint of the shortened dissolution time and softening point of an asphalt composition.

The temperature at which the polymer of the present embodiment has the peak top of loss tangent (tan δ) is preferably −55° C. or higher, more preferably −50° C. or higher, even more preferably −45° C. or higher, further preferably −40° C. or higher, from the viewpoint of high compatibility with asphalt and softening point.

Also, the temperature at which the polymer of the present embodiment has the peak top of loss tangent (tan δ) is preferably −10° C. or lower, more preferably −13° C. or lower, even more preferably −15° C. or lower, from the viewpoint of the flexibility, recovery after tension, and resistance to aggregate spalling of an asphalt composition.

The value of the peak top of loss tangent (tan δ) is preferably 0.7 or higher and 1.47 or lower, more preferably 0.7 or higher and 1.44 or lower, even more preferably 0.7 or higher and 1.41 or lower, from the viewpoint of the shortened dissolution time and softening point of an asphalt composition.

The value of the peak top is preferably 0.7 or higher, more preferably 0.8 or higher, even more preferably 0.9 or higher, further preferably 1.0 or higher, from the viewpoint of the shortened dissolution time, softening point, and resistance to aggregate spalling of an asphalt composition.

Also, the value of the peak top is preferably 2.0 or lower, more preferably 1.6 or lower, even more preferably 1.5 or lower, further preferably 1.47 or lower, still further preferably 1.44 or lower, particularly preferably 1.41 or lower, further preferably 1.4 or lower, most preferably 1.3 or lower, from the viewpoint of the shortened dissolution time, softening point, and resistance to aggregate spalling of an asphalt composition.

The dynamic viscoelastic spectrum can be measured by a method described in Examples mentioned later.

The polymer of the present embodiment can have a peak top of loss tangent (tan δ) in the range of −70 to 0° C., preferably in the range of −55 to −10° C., by controlling the content ratios of the vinyl aromatic monomer units and the conjugated diene monomer units in the polymer block (B).

The value of the peak top of loss tangent (tan δ) tends to be larger as the randomness of the polymer block (B) is enhanced, the content of the vinyl aromatic monomer units in the polymer block (B) is decreased, the vinyl bond content is increased, the rate of hydrogenation is increased, or the content of the polymer block (A) is decreased. The value of the peak top of loss tangent (tan δ) can be adjusted to 0.7 or higher and 2.0 or lower, preferably 0.7 or higher and 1.5 or lower, by controlling the temperature and the duration of time required for the completion of addition of each monomer in polymerization for the polymer block (B).

Specifically, in a polymerization step, the internal temperature of the reactor is set to within the range of 56 to 90° C.; the internal pressure of the reactor is set to within the range of 0.1 MPa to 0.50 MPa; and the durations of time required for the completion of addition of conjugated diene monomers and styrene monomers to be added at a constant rate are each set to within the range of 10 to 60 minutes, preferably within the range of 10 to 35 minutes, or the numbers of portions in which these monomers are added are each set to 3 or more. In this way, the value of the peak top of loss tangent (tan δ) can be adjusted to 0.7 or higher and 2.0 or lower, preferably 0.7 or higher and 1.5 or lower. Preferably, the internal temperature of the reactor is set to within the range of 56 to 84° C.; the internal pressure of the reactor is set to within the range of 0.1 MPa to 0.40 MPa; and the durations of time required for the completion of addition of conjugated diene monomers and styrene monomers to be added at a constant rate are each set to within the range of 10 to 60 minutes, preferably within the range of 10 to 35 minutes, or the numbers of portions in which these monomers are added are each set to 3 or more.

In another approach, in the case of the hydrogenated polymer of the present embodiment, the value of the peak top can be controlled by setting the temperature of the hydrogenation reaction to 90° C. or higher and 120° C. or lower.

In the polymer of the present embodiment, the conjugated diene monomer units preferably consist of a conjugated diene monomer unit (a) derived from 1,2-bond and/or 3,4-bond and a conjugated diene monomer unit (b) derived from 1,4-bond.

In this context, the "conjugated diene monomer unit (a) derived from 1,2-bond and/or 3,4-bond" is a unit per conjugated diene compound resulting from the polymerization of a conjugated diene compound at 1,2-bond and/or 3,4-bond.

Also, the "conjugated diene monomer unit (b) derived from 1,4-bond" is a unit per conjugated diene compound resulting from the polymerization of a conjugated diene compound at 1,4-bond.

The content of the conjugated diene monomer unit (a) derived from 1,2-bond and/or 3,4-bond (hereinafter, also referred to as a vinyl bond content) in the polymer of the present embodiment is preferably 10 mol % or larger and 50 mol % or smaller, more preferably 15 mol % or larger and 50 mol % or smaller, even more preferably 15 mol % or larger and 45 mol % or smaller, further preferably 18 mol % or larger and 40 mol % or smaller, still further preferably 20 mol % or larger and 40 mol % or smaller, particularly preferably 21 mol % or larger and 32 mol % or smaller, most preferably 24 mol % or larger and 30 mol % or smaller, based on the total content of the conjugated diene monomer units from the viewpoint of the penetration of an asphalt composition.

When the vinyl bond content is 10 mol % or larger, there is a tendency to be able to reduce the amount of the polymer added to asphalt.

When the vinyl bond content is 50 mol % or smaller, there is a tendency to enhance heat aging resistance and weather resistance.

The vinyl bond content can be measured by NMR and can be specifically determined by a method described in Examples mentioned later.

The distribution of the vinyl bond content in the copolymer block comprising conjugated diene monomer units, i.e., the polymer block (B), is not limited.

The contents of an unhydrogenated conjugated diene monomer unit (a) derived from 1,2-bond and/or 3,4-bond and an unhydrogenated conjugated diene monomer unit (b) derived from 1,4-bond, and the microstructure (ratio of cis, trans, and vinyl) of the conjugated diene monomer units in the polymer of the present embodiment can be adjusted by use of a polar compound, etc., mentioned later.

In the polymer of the present embodiment, preferably, the conjugated diene monomer units consist of a conjugated diene monomer unit (a) derived from 1,2-bond and/or 3,4-bond and a conjugated diene monomer unit (b) derived from 1,4-bond, and when the total content of the conjugated diene monomer units is defined as 100% by mass, the content of an alkenyl monomer unit (a1) with the conjugated diene monomer unit (a) hydrogenated is 10% by mass or larger and 50% by mass or smaller, the content of an alkenyl monomer unit (b1) with the conjugated diene monomer unit (b) hydrogenated is 0% by mass or larger and 80% by mass or smaller, and the sum of the contents of an unhydrogenated conjugated diene monomer unit (a) and an unhydrogenated conjugated diene monomer unit (b) after hydrogenation is 0% by mass or larger and 90% by mass or smaller.

In the polymer of the present embodiment, the content of the alkenyl monomer unit (a1) with the conjugated diene monomer unit (a) hydrogenated is represented by X % by mass based on the total content of the conjugated diene monomer units, and the content of the alkenyl monomer unit (b1) with the conjugated diene monomer unit (b) hydrogenated is represented by Y % by mass based on the total content of the conjugated diene monomer units.

In this respect, the sum of the unhydrogenated conjugated diene monomer unit (a) and the unhydrogenated conjugated diene monomer unit (b) can be represented by Z % by mass=100−(X+Y).

X/Y/Z is preferably in the range of 10 to 50/0 to 80/0 to 90, more preferably in the range of 20 to 40/0 to 25/55 to 70, even more preferably in the range of 20 to 40/15 to 45/35 to 45, further preferably in the range of 20 to 40/35 to 70/15 to 30, from the viewpoint of a shortened dissolution time and softening point.

The values of X, Y, and Z can each be calculated by a method described in Examples mentioned later.

The melt flow rate (MFR) of the polymer of the present embodiment is preferably 0.05 g/10 min or higher and 10 g/10 min or lower.

When the MFR of the polymer of the present embodiment falls within the range described above, the resulting asphalt composition is excellent in the balance between workability and softening point.

The MFR of the polymer is more preferably 0.05 g/10 min or higher and 8 g/10 min or lower, even more preferably 0.05 g/10 min or higher and 6 g/10 min or lower.

The MFR of the polymer is preferably 0 g/10 min or higher, more preferably 0.05 g/10 min or higher, even more preferably 0.10 g/10 min or higher, further preferably 0.20 g/10 min or higher, from the viewpoint of productivity.

Also, the MFR of the polymer is preferably 5 g/10 min or lower, more preferably 2 g/10 min or lower, even more preferably 1 g/10 min or lower, from the viewpoint of the recovery after tension and resistance to aggregate spalling of an asphalt composition.

The MFR of the polymer can be calculated by a method according to JIS K 7210 using the polymer of the present embodiment and a melt indexer (L247; manufactured by TechnolSeven Co., Ltd.). The measurement is preferably carried out under L conditions involving a test temperature of 230° C., a test load of 2.16 kgf, and a measurement value unit of g/10 min.

The weight-average molecular weight (Mw) of the polymer of the present embodiment is preferably 50000 or higher and 400000 or lower, more preferably 50000 or higher and 350000 or lower, even more preferably 50000 or higher and 300000 or lower, further preferably 60000 or higher and 300000 or lower, still further preferably 70000 or higher and 280000 or lower, particularly preferably 70000 or higher and 260000 or lower, most preferably 70000 or higher and lower than 200000, from the viewpoint of the balance between softening point and melt viscosity of an asphalt composition.

The weight-average molecular weight (Mw) of the polymer of the present embodiment is preferably 50000 or higher, more preferably 100000 or higher, even more preferably 130000 or higher, further preferably 160000 or higher, still further preferably 170000 or higher, from the viewpoint of the recovery after tension, resistance to aggregate spalling, and balance between softening point and melt viscosity of an asphalt composition.

Also, the weight-average molecular weight (Mw) of the polymer of the present embodiment is preferably 400000 or lower, more preferably 320000 or lower, even more preferably 300000 or lower, further preferably 280000 or lower, still further preferably 260000 or lower, particularly preferably 250000 or lower, further preferably 230000 or lower, most preferably lower than 200000, from the viewpoint of productivity and the melt viscosity and dispersibility of an asphalt composition.

In the present embodiment, the molecular weight distribution (Mw/Mn) (ratio of the weight-average molecular weight (Mw) to the number-average molecular weight (Mn)) of the polymer is preferably 2.0 or lower, more preferably 1.8 or lower, even more preferably 1.5 or lower, from the viewpoint of the balance between softening point and melt viscosity of an asphalt composition.

The molecular weight distribution of the polymer is preferably 1.01 or higher, more preferably 1.03 or higher, even more preferably 1.05 or higher, further preferably 1.10 or higher, still further preferably 1.11 or higher, particularly preferably 1.20 or higher, from the viewpoint of the balance between softening point and melt viscosity of an asphalt composition, and reduction in the amount of the polymer added to asphalt.

Also, the molecular weight distribution of the polymer of the present embodiment is preferably 10.0 or lower, more preferably 5.0 or lower, even more preferably 2.0 or lower, further preferably 1.7 or lower, still further preferably 1.4 or lower, particularly preferably 1.3 or lower, from the viewpoint of productivity and reduction in the amount of the polymer added to asphalt.

The weight-average molecular weight and the molecular weight distribution can be determined by a method described in Examples mentioned later.

In the case of the hydrogenated polymer of the present embodiment, the weight-average molecular weight and the molecular weight distribution are almost equal to the weight-average molecular weight and the molecular weight distribution of the polymer before hydrogenation. Therefore, the weight-average molecular weight and the molecular weight distribution of the hydrogenated polymer can be determined by measuring the weight-average molecular weight and the molecular weight distribution of the polymer before hydrogenation.

In the present embodiment, the weight-average molecular weight and the rate of hydrogenation of the polymer are preferably in the ranges of the following relational expressions from the viewpoint of productivity, softening point, viscosity, and dispersibility:

Upper limit: $Y=-0.114X+38.83$

Lower limit: $Y=-0.1X+23$.

(X represents the rate of hydrogenation (mol %), and Y represents the weight-average molecular weight (ten thousand)).

The polymer of the present embodiment is not particularly limited by its structure, and a polymer having any structure can be used.

Examples thereof include polymers having structures represented by the following formulas:

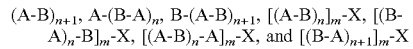

$(A-B)_{n+1}$, $A-(B-A)_n$, $B-(A-B)_{n+1}$, $[(A-B)_n]_m-X$, $[(B-A)_n-B]_m-X$, $[(A-B)_n-A]_m-X$, and $[(B-A)_{n+1}]_m-X$ wherein each A independently represents a polymer block (A) comprising principally vinyl aromatic monomer units; each B independently represents a polymer block (B) comprising conjugated diene monomer units and vinyl aromatic monomer units; each n independently represents an integer of 1 or larger and each are preferably an integer of 1 to 5; each m independently represents an integer of 2 or larger and each are preferably an integer of 2 to 11; and each X independently represents a residue of a coupling agent or a residue of a multifunctional initiator.

The polymer of the present embodiment may be any mixture of polymers having the structures represented by the formulas described above.

Among the formulas representing the structures of the polymer, a polymer having an A-B-A structure is preferred from the viewpoint of balanced asphalt binder performance.

The coupling structure is preferably a linear structure from the viewpoint of a low viscosity of an asphalt composition and is preferably a radial structure from the viewpoint of a high softening point of an asphalt composition. The radial structure is preferably a 3-branch or 4-branch structure, more preferably a structure having both 3-branch and 4-branch structures.

The ratio between the 3-branch structure and the 4-branch structure is preferably 5/95 to 95/5 (3-branch/4-branch) and is more preferably 90/10 or less, even more preferably 75/25 or less, further preferably 60/40 or less, still further preferably 40/60 or less (3-branch/4-branch), from the viewpoint of a high softening point.

Also, the 3-branch/4-branch ratio is preferably 10/90 or more, more preferably 25/75 or more, even more preferably 50/50 or more, further preferably 70/30 or more, from the viewpoint of a low viscosity.

In the polymer of the present embodiment, the vinyl aromatic monomer units in the polymer block (B) may be uniformly distributed or may be distributed in a tapered form, a stair form, a convex form, or a concave form.

In this context, the tapered structure means a structure in which the content of the vinyl aromatic monomer units gradually increases along the polymer chain in the polymer block (B).

When the content of the vinyl aromatic monomer units in the polymer block (B) immediately after the start of the polymerization for the polymer block (B) is defined as S1, the content of the vinyl aromatic monomer units in the polymer during the process of the polymerization, for example, at the point in time when ½ of the monomers introduced are polymerized, is defined as S2, and the content of the vinyl aromatic monomer units in the polymer block (B) after the completion of the polymerization is defined as S3, the tapered structure establishes relations S2/S1>1 and S3/S2>1.

The polymer block (B) may contain a plurality of moieties in which the vinyl aromatic monomer units are uniformly distributed, and/or a plurality of moieties in which the vinyl aromatic monomer units are distributed in a tapered form. Also, the polymer block (B) may contain a plurality of segments differing in the content of the vinyl aromatic monomer units.

The content of a short-chain vinyl aromatic monomer-polymerized moiety in the polymer block (B) in the polymer of the present embodiment is preferably 50% by mass or larger.

When the content of the short-chain vinyl aromatic monomer-polymerized moiety in the polymer block (B) falls within the range described above, an asphalt composition excellent in elongation and dispersibility is obtained.

In this case, the recovery after tension, heat aging resistance, and resistance to aggregate spalling of an asphalt composition are also improved.

The content of the short-chain vinyl aromatic monomer-polymerized moiety is more preferably 70% by mass or larger, even more preferably 80% by mass or larger, further preferably 90% by mass or larger, from the viewpoint of the elongation and dispersibility of an asphalt composition.

The upper limit of the content of the short-chain vinyl aromatic monomer-polymerized moiety in the polymer block (B) is not particularly limited and is preferably 100% by mass or smaller, more preferably 99% by mass or smaller.

In this context, the short-chain vinyl aromatic monomer-polymerized moiety is a component consisting of 2 to 6 vinyl aromatic monomer units in the polymer block (B).

The content of the short-chain vinyl aromatic monomer-polymerized moiety is determined as the content of linkages of 2 to 6 vinyl aromatic monomer units with the content of the vinyl aromatic monomer units in the polymer block (B) defined as 100% by mass.

The content of the linkage of 2 vinyl aromatic monomer units is preferably 10% by mass or larger and 45% by mass or smaller, more preferably 13% by mass or larger and 42% by mass or smaller, even more preferably 19% by mass or larger and 36% by mass or smaller, based on 100% by mass of the vinyl aromatic monomer units in the copolymer block (B) from the viewpoint of high compatibility with asphalt.

The content of the linkage of 3 vinyl aromatic monomer units is preferably 45% by mass or larger and 80% by mass or smaller, more preferably 45% by mass or larger and 75% by mass or smaller, even more preferably 45% by mass or larger and 65% by mass or smaller, based on 100% by mass of the vinyl aromatic monomer units in the copolymer block (B) from the viewpoint of high compatibility with asphalt.

The content of the short-chain vinyl aromatic monomer-polymerized moiety in the polymer block (B) can be controlled by adjusting, for example, the numbers of portions in which conjugated diene monomers and aromatic vinyl monomers are added, the duration of time required for the completion of addition of each monomer, and the internal temperature of the reactor in polymerization for the copolymer block (B), and can be controlled by adjusting any of the number of portions in which each monomer is added, the duration of time required for the completion of addition of each monomer, and the internal temperature of the reactor or by adjusting these factors in appropriate combination.

The content of the short-chain vinyl aromatic monomer-polymerized moiety tends to be increased as the numbers of portions in which conjugated diene monomers and aromatic vinyl monomers are added are increased. The number of portions in which each monomer is added is preferably 2 or more.

The content of the short-chain vinyl aromatic monomer-polymerized moiety tends to be increased as the duration of time required for the completion of addition of each monomer is lengthened. The duration of time required for the completion of addition of each monomer is preferably 20 minutes or longer and 80 minutes or shorter.

The content of the short-chain vinyl aromatic monomer-polymerized moiety tends to be increased as the internal temperature of the polymerization reactor for the polymer is raised. The internal temperature of the reactor is preferably 56° C. to 90° C.

The Bragg spacing of the polymer of the present embodiment is 27 nm or larger and 50 nm or smaller.

The Bragg spacing is a value calculated from a primary peak obtained by X-ray small-angle scattering (SAXS) analysis.

The Bragg spacing is preferably 27 nm or larger, more preferably 28 nm or larger, even more preferably 29 nm or larger, further preferably 30 nm or larger, from the viewpoint of obtaining a high softening point of an asphalt composition.

Also, the Bragg spacing of the polymer of the present embodiment is preferably 50 nm or smaller, more preferably 48 nm or smaller, even more preferably 46 nm or smaller, further preferably 45 nm or smaller, from the viewpoint of workability.

The Bragg spacing is preferably 38.5 nm or smaller, more preferably 38.0 nm or smaller, even more preferably 37.5 nm or smaller, further preferably 37 nm or smaller, from the viewpoint of high compatibility with asphalt.

The Bragg spacing of the polymer of the present embodiment can be measured by a method described in Examples mentioned later.

The Bragg spacing of the polymer of the present embodiment tends to be larger as the molecular weight of the polymer is increased, the content of the polymer block (A) is increased, the rate of hydrogenation is increased, the vinyl bond content is increased, or the content of the vinyl aromatic monomer units in the copolymer block (B) is decreased. The value of the Bragg spacing of the polymer can be adjusted to 27 nm or larger and 50 nm or smaller by controlling the specific energy (value obtained by dividing stirring power by the amount of the reaction solution in the polymerization vessel) and the numbers of portions in which conjugated diene monomers and vinyl aromatic monomers are added or the duration of time required for the completion of addition of each monomer in polymerization for the polymer block (B).

Specifically, the value of the specific energy is set to within the range of 0.1 kw/m$^3$ to 0.4 kw/m$^3$, and the numbers of portions in which conjugated diene monomers and vinyl aromatic monomers are added are each set to 3 or more, or the duration of time required for the completion of addition of each monomer is set to 10 to 70 minutes. In this way, the Bragg spacing can be adjusted to 27 nm or larger and 38.5 nm or smaller. The value of the specific energy is set to within the range of 0.1 kw/m$^3$ to 0.5 kw/m$^3$, and the numbers of portions in which conjugated diene monomers and vinyl aromatic monomers are added are each set to 3 or more, or the duration of time required for the completion of addition of each monomer is set to 10 to 70 minutes. In this way, the Bragg spacing can be adjusted to 27 nm or larger and 50 nm or smaller.

The Bragg spacing of the polymer of the present embodiment tends to be larger as the specific energy is elevated.

(Form of Polymer)

The bulk density of the polymer of the present embodiment before mixing with asphalt is preferably 0.05 g/mL or larger from the viewpoint of reduction in the amount of the polymer added to asphalt, high solubility in asphalt, high work efficiency, and transportation cost, etc.

The bulk density of the polymer is more preferably 0.10 g/mL or larger, even more preferably 0.17 g/mL or larger, further preferably 0.25 g/mL or larger.

Also, the bulk density of the polymer is preferably 0.45 g/mL or smaller, more preferably 0.38 g/mL or smaller, even more preferably 0.35 g/mL or smaller, further preferably 0.30 g/mL or smaller, from the viewpoint of reduction in the amount of the polymer added to asphalt and high solubility in asphalt.

The specific surface area of the polymer of the present embodiment before mixing with asphalt is preferably 0.10 m$^2$/g or larger, more preferably 0.20 m$^2$/g or larger, even more preferably 0.30 m$^2$/g or larger, further preferably 0.41 m$^2$/g or larger, from the viewpoint of reduction in the amount of the polymer added to asphalt and high solubility in asphalt.

Also, the specific surface area is preferably 0.55 m$^2$/g or smaller, more preferably 0.52 m$^2$/g or smaller, even more preferably 0.50 m$^2$/g or smaller, further preferably 0.48 m$^2$/g or smaller, from the viewpoint of reduction in the amount of the polymer added to asphalt, high solubility in asphalt, high work efficiency, and transportation cost, etc.

(Method for Producing Polymer)

The polymer of the present embodiment can be produced, for example, by anion living polymerization using a polymerization initiator such as an organic alkali metal compound in a hydrocarbon solvent.

Examples of the hydrocarbon solvent include, but are not limited to: aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

Examples of the polymerization initiator include, but are not limited to, aliphatic hydrocarbon alkali metal compounds, aromatic hydrocarbon alkali metal compounds, and organic amino alkali metal compounds having anion polymerization activity against conjugated diene and vinyl aromatic compounds.

Examples of the alkali metal include, but are not limited to, lithium, sodium, and potassium.

In the present embodiment, a tertiary amine compound or an ether compound, which is a polar compound, may be added in order to adjust the vinyl bond (1,2-bond or 3,4-bond) content attributed to conjugated diene monomer units incorporated in the polymer or to adjust the random polymerizability of conjugated diene and vinyl aromatic compounds, in the polymerization of the conjugated diene compound and the vinyl aromatic compound with the organic alkali metal compound as a polymerization initiator.

Examples of the tertiary amine compound as a polar compound include, but are not limited to, compounds represented by the formula R1R2R3N (wherein R1, R2, and R3 each independently represent a hydrocarbon group having 1 to 20 carbon atoms or a hydrocarbon group having a tertiary amino group).

Specific examples thereof include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

Examples of the ether compound as a polar compound include, but are not limited to, linear ether compounds and cyclic ether compounds.

Examples of the linear ether compounds include, but are not limited to: dimethyl ether, diethyl ether, and diphenyl ether; dialkyl ether compounds of ethylene glycol such as ethylene glycol dimethyl ether, ethylene glycol diethyl ether, and ethylene glycol dibutyl ether; and dialkyl ether compounds of diethylene glycol such as diethylene glycol dimethyl ether, diethylene glycol diethyl ether, and diethylene glycol dibutyl ether.

Examples of the cyclic ether compounds include, but are not limited to, tetrahydrofuran, dioxane, 2,5-dimethyloxolane, 2,2,5,5-tetramethyloxolane, 2,2-bis(2-oxolanyl)propane, and alkyl ether of furfuryl alcohol.

In the present embodiment, the method for polymerizing the conjugated diene compound and the vinyl aromatic compound using an organic alkali metal compound as a polymerization initiator may be batch polymerization or continuous polymerization, or may be a combination of these methods.

The polymerization temperature is usually 0° C. or higher and 180° C. or lower, preferably 30° C. or higher and 150° C. or lower.

The time required for the polymerization differs depending on other conditions and is usually within 48 hours, preferably 0.1 to 10 hours.

The atmosphere of the polymerization system is preferably an inert gas atmosphere such as a nitrogen gas atmosphere.

The polymerization pressure is not particularly limited as long as the pressure falls within a range sufficient for maintaining the monomers and a solvent in a liquid phase in the polymerization temperature range described above.

It should be noted that the polymerization system is not contaminated with impurities (e.g., water, oxygen, and carbon dioxide), which inactivate catalysts and living polymers.

In the production process for the polymer of the present embodiment, coupling reaction can also be carried out using a di- or higher functional coupling agent at the completion of the polymerization mentioned above.

The di- or higher functional coupling agent is not particularly limited, and any coupling agent known in the art can be used.

Examples of the difunctional coupling agent include, but are not limited to: dihalogen compounds such as dimethyldichlorosilane and dimethyldibromosilane; and acid esters such as methyl benzoate, ethyl benzoate, phenyl benzoate, and phthalic acid ester.

Examples of the tri- or higher multifunctional coupling agents include, but are not limited to: tri- or higher hydric polyalcohols; polyvalent epoxy compounds such as epoxidized soybean oil and diglycidyl bisphenol A; and polyhalogen compounds such as silicon halide compounds represented by the formula $R_{4-n}SiX_n$ (wherein each R independently represents a hydrocarbon group having 1 to 20 carbon atoms, each X independently represents a halogen atom, and n represents 3 or 4), for example, methylsilyl trichloride, t-butylsilyl trichloride, silicon tetrachloride, and bromides thereof, and tin halide compounds represented by the formula $R_{4-n}SnX_n$ (wherein each R independently represents a hydrocarbon group having 1 to 20 carbon atoms, each X independently represents a halogen atom, and n represents 3 or 4), for example, methyltin trichloride, t-butyltin trichloride, and tin tetrachloride. Alternatively, dimethyl carbonate, diethyl carbonate, 1,3-bis(N,N'-diglycidylaminomethyl)cyclohexane, or the like can also be used as a multifunctional coupling agent.

In the present embodiment, the hydrogenation method for hydrogenating the polymer of the present embodiment is not particularly limited, and any method known in the art can be used.

The hydrogenation catalyst for use in the hydrogenation of the polymer is not particularly limited and is any catalyst heretofore known in the art, i.e., (1) a supported heterogeneous hydrogenation catalyst in which a metal such as Ni, Pt, Pd, or Ru is supported on carbon, silica, alumina, diatomite, or the like, (2) a so-called Ziegler-type hydrogenation catalyst in which a transition metal salt such as an organic acid salt or an acetylacetone salt of Ni, Co, Fe, Cr, or the like is used in combination with a reducing agent such as organoaluminum, or (3) a homogeneous hydrogenation catalyst, for example, a so-called organometallic complex such as an organometallic compound of Ti, Ru, Rh, Zr, or the like.

Examples of the hydrogenation catalyst that can be used include, but are not limited to, hydrogenation catalysts described in Japanese Patent Publication Nos. 63-4841, 1-53851, and 2-9041. Preferred examples of the hydrogenation catalyst include titanocene compounds and/or their mixtures with reducing organometallic compounds.

Examples of the titanocene compounds that can be used include, but are not limited to, compounds described in Japanese Patent Laid-Open No. 8-109219 and specifically include compounds having at least one or more ligands having a (substituted) cyclopentadienyl skeleton (e.g., bis(cyclopentadienyl)titanium dichloride and mono(pentamethylcyclopentadienyl)titanium trichloride), an indenyl skeleton, or a fluorenyl skeleton.

Examples of the reducing organometallic compounds include, but are not limited to, organic alkali metal compounds such as organolithium, organomagnesium compounds, organoaluminum compounds, organoboron compounds, and organozinc compounds.

The hydrogenation reaction of the polymer is usually carried out in a temperature range of 0 to 200° C., preferably in a temperature range of 30 to 150° C.

The pressure of hydrogen for use in the hydrogenation reaction is usually 0.1 MPa or higher and 15 MPa or lower, preferably 0.2 MPa or higher and 10 MPa or lower, more preferably 0.3 MPa or higher and 5 MPa or lower.

The hydrogenation reaction time is usually 3 minutes to 10 hours, preferably 10 minutes to 5 hours.

The hydrogenation reaction can employ a batch process or a continuous process, or a combination of these processes.

If necessary, catalyst residues can be removed from the solution of the hydrogenated polymer thus obtained to separate the hydrogenated polymer from the solution. Examples of the method for separating a solvent can include a method which involves precipitating and recovering the polymer by the addition of a polar solvent, such as acetone or alcohol, which serves as a poor solvent to the hydrogenated polymer, etc., to the reaction solution after the hydrogenation, a method which involves adding the reaction solution into boiling water with stirring and removing a solvent by steam stripping to recover the polymer, and a method which involves distilling off a solvent by directly heating the polymer solution.

The polymer of the present embodiment can be supplemented with any of various stabilizers such as phenol stabilizers, phosphorus stabilizers, sulfur stabilizers, and amine stabilizers.

In the step of hydrogenating the polymer, conjugated bonds in the vinyl aromatic monomer units may be hydrogenated.

The rate of hydrogenation of conjugated bonds in all of the vinyl aromatic monomer units is preferably 30 mol % or lower, more preferably 10 mol % or lower, even more preferably 3 mol % or lower.

The lower limit of the rate of hydrogenation of conjugated bonds in all of the vinyl aromatic monomers is not particularly limited and is 0 mol %. When the rate of hydrogenation of conjugated bonds in all of the vinyl aromatic monomers falls within the range described above, the dispersibility of an asphalt composition tends to be enhanced.

[Asphalt Composition]

The asphalt composition of the present embodiment comprises 0.5 parts by mass or more and 50 parts by mass or less of the polymer of the present embodiment mentioned above, and 100 parts by mass of asphalt.

(Asphalt) Examples of the asphalt that can be used in the present embodiment include, but are not limited to, by-products from petroleum refining (petroleum asphalt), those obtained as natural products (natural asphalt), and their mixtures with petroleums.

The main component of the asphalt is a substance called as bitumen.

Examples of the asphalt include, but are not limited to, straight asphalt, semi-blown asphalt, blown asphalt, tar, pitch, cutback asphalt supplemented with oil, and asphalt emulsions.

Only one of these asphalts may be used alone, or two or more thereof may be used as a mixture.

Preferred examples of the asphalt include straight asphalt having a penetration (measured according to JIS-K 2207) of preferably 30 (1/10 mm) or more and 300 (1/10 mm) or less, more preferably 40 (1/10 mm) or more and 200 (1/10 mm) or less, even more preferably 45 (1/10 mm) or more and 150 (1/10 mm) or less.

In the asphalt composition of the present embodiment, the mixing ratio of the polymer is 0.5 parts by mass or more and 50 parts by mass or less as mentioned above, preferably 1 part by mass or more and 30 parts by mass or less, more preferably 2 parts by mass or more and 20 parts by mass or less, based on 100 parts by mass of the asphalt.

When the mixing ratio of the polymer is 0.5 parts by mass or more, a favorable softening point and rubber elasticity are obtained. When the mixing ratio of the polymer is 50 parts by mass or less, the balance between mechanical physical properties and viscosity (workability) is improved.

The asphalt composition of the present embodiment can be supplemented, if necessary, with an arbitrary petroleum resin.

Examples of the petroleum resin include, but are not limited to: aliphatic petroleum resins such as C5 petroleum resins; aromatic petroleum resins such as C9 petroleum resins; alicyclic petroleum resins such as dicyclopentadiene petroleum resins; petroleum resins such as C5/C9 copolymer petroleum resins; and hydrogenated petroleum resins obtained by hydrogenating these petroleum resins.

The amount of the petroleum resin mixed is not particularly limited and is preferably 1 part by mass or more and 10 parts by mass or less, more preferably 2 parts by mass or more and 6 parts by mass or less, based on 100 parts by mass of the asphalt.

The asphalt composition of the present embodiment can be supplemented, if necessary, an arbitrary additive.

The additive is not particularly limited as long as the additive can be generally used in the formulation of thermoplastic resins or rubber polymers.

Examples of the additive include, but are not limited to: inorganic fillers such as calcium carbonate, magnesium carbonate, magnesium hydroxide, calcium sulfate, barium sulfate, silica, clay, talc, mica, wollastonite, montmorillonite, zeolite, alumina, titanium oxide, magnesium oxide, zinc oxide, slag wool, and glass fibers; pigments such as carbon black and iron oxide; lubricants such as stearic acid, behenic acid, zinc stearate, calcium stearate, magnesium stearate, and ethylenebisstearamide; mold release agents; softening agents and plasticizers such as paraffinic process oils, naphthenic process oils, aromatic process oils, paraffin, organic polysiloxane, and mineral oils; antioxidants such as hindered phenol antioxidants and phosphorus heat stabilizers; hindered amine light stabilizers; benzotriazole ultraviolet absorbers; flame retardants; antistatic agents; reinforcing agents such as organic fibers, glass fibers, carbon fibers, and metal whiskers; colorants; and other additives; and mixtures thereof; and additives described in, for example, "Chemicals for Rubber/Plastics" (edited by Rubber Digest, Co., Ltd., Japan).

The amount of the additive mixed in the asphalt composition of the present embodiment is not particularly limited and can be appropriately selected. The amount of the additive mixed is usually 50 parts by mass or less based on 100 parts by mass of the asphalt.

The asphalt composition of the present embodiment may also contain an additional polymer other than the polymer of the present embodiment mentioned above. Examples of the additional polymer include, but are not particularly limited to: natural rubbers; polyisoprene rubbers; polybutadiene rubbers; styrene-butadiene rubbers; olefin elastomers such as ethylene-propylene copolymers; chloroprene rubbers; acrylic rubbers; olefin polymers such as ethylene-vinyl acetate copolymers, ethylene-ethyl acrylate copolymers, atactic polypropylene, and amorphous polyalphaolefin; and thermoplastic olefin elastomers such as blends of polypropylene with ethylene-propylene copolymers, blends of polypropylene with ethylene-propylene-diene ternary copolymers, and copolymers of ethylene or the like.

Only one of these polymers may be used alone, or two or more thereof may be used in combination.

An olefin polymer is preferably used as the additional polymer other than the polymer of the present embodiment from the viewpoint of high heat aging resistance and softening point of the asphalt composition of the present embodiment.

Among others, an olefin polymer having at least propylene units is preferred.

The amount of the additional polymer added is preferably 5 to 40 parts by mass based on 100 parts by mass of the polymer of the present embodiment.

When the additional polymer other than the polymer of the present embodiment mentioned above is a block copolymer (α), the block copolymer (α) is preferably a block copolymer consisting of at least one polymer block (A) comprising principally vinyl aromatic monomer units, and at least one polymer block (C) comprising principally conjugated diene monomer units.

Preferred examples of the block copolymer (α) include, but are not particularly limited to, SIS, SBS, SEBS, and SEPS.

Among them, SBS is preferred from the viewpoint of low-temperature elongation.

The phrase "comprising principally conjugated diene monomer units" means that the polymer block comprises larger than 90% by mass, preferably 95% by mass or larger, of the conjugated diene monomer units.

The upper limit is not particularly limited and is preferably 100% by mass or smaller, more preferably 99% by mass or smaller.

When the asphalt composition of the present embodiment contains the block copolymer (α) mentioned above, the mixing ratio of the block copolymer (α) is preferably 0.5 parts by mass or more and 50 parts by mass or less in terms of the total of the polymer of the present embodiment mentioned above and the block copolymer (α) based on 100 parts by mass of the asphalt.

The mixing ratio of the polymer of the present embodiment is preferably 0.5 parts by mass or more and 20 parts by mass or less, more preferably 0.5 parts by mass or more and 15 parts by mass or less, based on 100 parts by mass of the asphalt from the viewpoint of economic efficiency.

The amount of the block copolymer (α) mixed is preferably in the range of 15 to 85% by mass in the total amount of the polymer of the present embodiment and the block copolymer (α) from the viewpoint of favorable low-temperature elongation. The amount of the block copolymer (α) mixed is preferably 30% by mass or larger, more preferably 50% by mass or larger, even more preferably 65% by mass or larger, further preferably 75% by mass or larger, from the viewpoint of favorable low-temperature performance and a low viscosity. Also, the amount of the block copolymer (α) mixed is preferably 75% by mass or smaller, more preferably 60% by mass or smaller, even more preferably 45% by mass or smaller, further preferably 35% by mass or smaller, from the viewpoint of a high softening point and recovery after tension.

Examples of the structure of the block copolymer (α) include, but are not particularly limited to, structures represented by the following formulas (i) to (vi):

$$(A\text{-}C)_n \tag{i}$$

$$C\text{-}(A\text{-}C)_n \tag{ii}$$

$$A\text{-}(C\text{-}A)_n \tag{iii}$$

$$A\text{-}(C\text{-}A)_n\text{-}X \tag{iv}$$

$$[(A\text{-}C)_k]_m\text{-}X \tag{v}$$

$$[(A\text{-}C)_k\text{-}A]_m\text{-}X \tag{vi}$$

wherein A represents a block comprising principally vinyl aromatic monomer units; C represents a block comprising principally conjugated diene monomer units; X represents a residue of a coupling agent or a residue of a polymerization initiator such as multifunctional organolithium; and m, n, and k each represent an integer of 1 or larger and each are preferably an integer of 1 to 5.

Examples of the coupling agent or the polymerization initiator such as multifunctional organolithium include, but are not limited to, silicon tetrachloride, tin tetrachloride, epoxidized soybean oil, polyhalogenated hydrocarbon compounds, carboxylic acid ester compounds, polyvinyl compounds, bisphenol epoxy compounds, epoxy compounds, alkoxysilane compounds, halogenated silane compound, and ester compounds.

The block copolymer (α) may be a mixture of a coupled form in which X is a residue of a coupling agent, and a non-coupled form in which X is absent or X is a residue of a polymerization initiator.

The block copolymer (α) preferably has a styrene content of 20 to 50% by mass, a vinyl bond content of 8 to 60% by mass, and a polystyrene-based weight-average molecular weight of 10 to 500000.

The block copolymer (α) more preferably has the structure of the formula (v) or (vi) wherein m is 2 or larger, from the viewpoint of a high softening point and high recovery after tension of the asphalt composition.

A functional group is preferably added to the polymer of the present embodiment that needs to be improved in terms of a high softening point of the asphalt composition, the resistance of the asphalt composition to adhesion to an aggregate, the high flow rutting resistance of an asphalt mixture, and high abrasion resistance.

Examples of the method for modifying the polymer of the present embodiment in order to add a functional group to the polymer include a method which involves subjecting a modifier that generates a functional group-containing atomic group to an addition reaction with a living end of the polymer.

The element contained in the functional group is particularly preferably oxygen, nitrogen, phosphorus, sulfur, tin, or silicon.

The functional group for the polymer of the present embodiment is particularly preferably at least one group selected from a hydroxy group, an acid anhydride group, an epoxy group, an amino group, a silanol group, and an alkoxysilane group.

The modification reaction that confers a branch structure also functions as the coupling agent mentioned above.

The polymer of the present embodiment preferably has a functional group containing nitrogen from the viewpoint of further improving flow rutting resistance. The polymer of the present embodiment more preferably contains 2 to 4 mol % of the functional group in one molecule. The polymer of the present embodiment further preferably contains both of a functional group containing nitrogen and a functional group containing oxygen.

Examples of the modifier include, but are not limited to, tetraglycidyl meta-xylenediamine, tetraglycidyl-1,3-bisaminomethylcyclohexane, tetraglycidyl-p-phenylenediamine, tetraglycidyl diaminodiphenylmethane, diglycidylaniline, γ-caprolactone, γ-glycidoxyethyltrimethoxysilane, γ-glycidoxypropyltrimethoxysilane, γ-glycidoxypropyltriphenoxysilane, γ-glycidoxypropylmethyldimethoxysilane, γ-glycidoxypropyldiethylethoxysilane, γ-glycidoxypropyldimethylethoxysilane, γ-glycidoxypropylmethyldiisopropenoxysilane, bis(γ-glycidoxypropyl)dimethoxysilane, bis(γ-glycidoxypropyl)diethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, 1,3-dimethyl-2-imidazolidinone, 1,3-diethyl-2-imidazolidinone, N,N'-dimethylpropyleneurea, and N-methylpyrrolidone.

The amount of the modifier used described above is preferably 0.5 to 5 equivalents based on 1 equivalent of the living end of the polymer.

A radial polymer containing a functional group is more preferred from the viewpoint of the balance between a low viscosity and a high softening point.

Cross-linking is preferred in the case of requiring improvement in terms of high solubility of the polymer of the present embodiment or the additional polymer in asphalt, the resistance of the asphalt composition to adhesion to an aggregate, high flow rutting resistance of an asphalt mixture, and high abrasion resistance.

Examples of the cross-linking agent include sulfur or sulfur compound, phosphorus, organic peroxide, epoxy, isocyanate, resin, amine, metal chelate, and thiuram cross-linking agents.

Only one of these cross-linking agents may be used alone, or two or more thereof may be used in combination.

Examples of the sulfur or sulfur compound cross-linking agent that can be used include, but are not limited to, elemental sulfur, sulfur chloride, morpholine disulfide tetramethylthiuram disulfide, selenium dimethyldithiocarbamate, 2-(4'-morpholinodithio)benzothiazole, 4,4'-dithiodimorpholine, and thioacetamide.

Examples of the phosphorus cross-linking agent that can be used include, but are not limited to, phosphoric anhydride ($P_2O_5$), polyphosphoric acid, phosphorus oxytrichloride ($POCl_3$), phosphorus trichloride ($PCl_3$), and phosphorus pentasulfide ($P_2S_5$).

Examples of the organic peroxide cross-linking agent that can be used include, but are not limited to, tert-butyl hydroperoxide, 1,1,3,3-tetramethylbutyl hydroperoxide, cumene hydroperoxide, diisopropylbenzene hydroperoxide, 2,5-dimethyl-2,5-di(tert-butylperoxy) hexane, 2,5-dimethyl-2,5-di(tert-butylperoxy) hexyne-3, 1,3-bis(tert-butylperoxyisopropyl) benzene, 2,5-dimethyl-2,5-di(benzoylperoxy) hexane, 1,1-bis(tert-butylperoxy)-3,3,5-trimethylcyclohexane, n-butyl-4,4-bis(tert-butylperoxy) valerate, benzoyl peroxide, and tert-butyl peroxyisobutyrate.

Examples of the epoxy cross-linking agent that can be used include, but are not limited to, ethylene-normal butyl acrylate-glycidyl methacrylate, neopentyl glycol diglycidyl ether, hexanediol diglycidyl ether, trimethylolpropane polyglycidyl ether, and hexahydrophthalic acid diglycidyl ester.

Examples of the isocyanate cross-linking agent that can be used include, but are not limited to, triallyl isocyanurate, trimethylene diisocyanate, tetramethylene diisocyanate, pentamethylene diisocyanate, and hexamethylene diisocyanate.

Examples of the resin cross-linking agent that can be used include, but are not limited to, alkylphenol-formaldehyde resins and hexamethoxymethyl-melamine resins.

Examples of the amine cross-linking agent that can be used include hexamethylene-diamine, triethylene-tetramine, tetraethylene-pentamine, hexamethylenediamine carbamate, N,N-dicinnamylidene-1,6-hexanediamine, 4,4-methylenebis(cyclohexylamine) carbamate, and 4,4-methylenebis(2-chloroaniline).

Examples of the metal chelate cross-linking agent that can be used include, but are not limited to, zinc methacrylate, magnesium methacrylate, zinc dimethacrylate, and magnesium dimethacrylate.

Among them, sulfur or a sulfur compound, or polyphosphoric acid is preferred from the viewpoint of large effects in the respects described above and economic efficiency.

The amount of the cross-linking agent in the asphalt composition of the present embodiment is preferably 0.03% by mass or larger from the viewpoint of high solubility of the block copolymer of the present embodiment or the additional polymer in asphalt, the resistance of the asphalt composition to adhesion to an aggregate, high flow rutting resistance of an asphalt mixture, and high abrasion resistance. The amount of the cross-linking agent is more preferably 0.05% by mass or larger, even more preferably 0.10% by mass or larger. On the other hand, the amount of the cross-linking agent is preferably 3% by mass or smaller, more preferably 1% by mass or smaller, even more preferably 0.5% by mass or smaller, further preferably 0.3% by mass or smaller, from the viewpoint of suppression of generation of toxic gas during production and economic efficiency.

A combination of a polymer having a radial structure with 1,3-bis(N,N'-diglycidylaminomethyl)cyclohexane used as a coupling agent, and sulfur or a sulfur compound, or polyphosphoric acid is preferred from the viewpoint of high resistance of the asphalt composition to adhesion to an aggregate, high flow rutting resistance, and high abrasion resistance.

The asphalt composition of the present embodiment can be used in the fields of road pavement, roofings or waterproof sheets, and sealants and can be particularly suitably used in the field of road pavement. The asphalt composition of the present embodiment is particularly suitable for the field of road pavement.

The asphalt composition of the present embodiment can be mixed with an appropriate aggregate to prepare a mixture for road pavement. The temperature at which the asphalt composition is mixed with the aggregate is preferably 90° C. to 200° C. At the temperature of 90° C. or higher, the aggregate and the asphalt composition can be uniformly mixed. At the temperature of 200° C. or lower, the asphalt composition can be prevented from being decomposed or cross-linked.

In the case of preparing the asphalt composition of the present embodiment into a mixture for road pavement, the mixture for road pavement can be produced in a mixture manufacturing plant for pavement, as with general mixtures for pavement. The mixer used for mixing and stirring can be any of continuous and batch types.

Examples of the mixing method include a method which involves first adding the aggregate heated to 90° C. to 200° C. to a mixer, dry-mixing the aggregate for 20 seconds to 30 seconds, then adding thereto the asphalt composition heated to the same temperature as in the aggregate, and mixing them for 40 to 60 seconds.

For example, an aggregate that abides by "Manual for Asphalt Pavement" published by Japan Road Association can be applied to the present embodiment. Alternatively, materials such as other various low-quality aggregates and regenerated aggregates may be used.

For example, crushed stone, cobblestone, ballast, and steel slag as well as granular materials similar thereto, such as artificial calcined aggregates, calcined foam aggregates, artificial lightweight aggregates, pottery powders, Luxabite, aluminum particles, plastic particles, ceramics, emery, construction wastes, and fibers can also be used.

In general, aggregates are broadly divided into coarse aggregates, fine aggregates, and fillers. The coarse aggregates are aggregates that remain on a 2.36 mm sieve, and generally include types such as crushed stone No. 7 having a particle size range of 2.5 to 5 mm, crushed stone No. 6 having a particle size range of 5 to 13 mm, crushed stone No. 5 having a particle size range of 13 to 20 mm, and crushed stone No. 4 having a particle size range of 20 to 30 mm. In the present embodiment, for example, one of or a mixture of two or more of these coarse aggregates having various particle size ranges, or a synthesized aggregate can be used. These coarse aggregates may be coated with approximately 0.3 to 1% by mass of straight asphalt based on the mass of each aggregate.

The fine aggregates refer to aggregates that pass through a 2.36 mm sieve and remain on a 0.075 mm sieve. Examples thereof include, but are not limited to, river sand, hill sand, mountain sand, sea sand, crushed sand, fine sand, screenings, crushed stone dust, silica sand, artificial sand, glass cullet, casting sand, and crushed sand of regenerated aggregates.

The fillers pass through a 0.075 mm sieve. Examples thereof include, but are not limited to, filler materials of screenings, stone dust, slaked lime, cement, incinerator ash, clay, talc, fly ash, and carbon black. In addition, even rubber powders, cork powders, wood powders, resin powders, fiber powders, pulp, artificial aggregates, and the like can also be used as fillers as long as these fillers pass through a 0.075 mm sieve.

In the case of preparing a road pavement mixture using the asphalt composition of the present embodiment, the particle size of the aggregate and the amount of the asphalt composition mixed can be selected according to, for example, "type of asphalt mixture and particle size range" described in page 92 of "Manual for Asphalt Pavement", Japan Road Association, published in December 1992. For example, a mixture for road pavement consisting of 2 to 15% by mass of the asphalt composition and 85 to 98% by mass of the aggregate is suitable.

The polymer of the present embodiment can also be suitably used in a composition for asphalt waterproof sheets.

Use of the polymer of the present embodiment can further improve the resistance to fatigue breakage, weather resistance, low-temperature crack resistance, high-temperature slippage resistance and sagging resistance, and load resistance of the asphalt waterproof sheets.

In the case of using the polymer of the present embodiment in a composition for asphalt waterproof sheets, the amount of the polymer added is larger than that used in the mixture for road pavement, and the ratio of the polymer to 100% by mass in total of the asphalt and the polymer is preferably 5% by mass or larger, more preferably 7% by mass or larger, even more preferably 9% by mass or larger, from the viewpoint of high flexibility, lower-temperature crack resistance, higher-temperature slippage resistance and sagging resistance, high fatigue bending strength, and weather resistance.

On the other hand, the ratio of the polymer to 100% by mass in total of the asphalt and the polymer is preferably 20% by mass or smaller, more preferably 17% by mass or smaller, even more preferably 14% by mass or smaller, from the viewpoint of the productivity of the composition for asphalt waterproof sheets, and economic efficiency.

The composition for asphalt waterproof sheets may optionally contain various polymers, a tackifier, a softening agent, an antioxidant, a weather resistance-imparting agent, an inorganic filler, a lubricant, a mold release agent, and a cross-linking agent, in addition to the polymer of the present embodiment In the case of constructing an asphalt waterproof sheet at normal temperature, the asphalt used preferably has high low-temperature usability, a low viscosity of the composition for asphalt waterproof sheets, high construction workability, and a high penetration.

In such a case, the penetration of the asphalt is preferably 80 ($1/10$ mm) or more, more preferably 100 ($1/10$ mm) or more, even more preferably 130 ($1/10$ mm) or more, further preferably 160 ($1/10$ mm) or more.

In the case of constructing an asphalt waterproof sheet at a high temperature by a torch-applied method or the like, the penetration is preferably lower than that in the case of construction at normal temperature so as to prevent the composition for asphalt waterproof sheets from having too low a viscosity, and is, for example, preferably 30 ($1/10$ mm) or more and 150 ($1/10$ mm) or less, more preferably 60 ($1/10$ mm) or more and 120 (⅒ mm) or less, even more preferably 80 (⅒ mm) or more and 100 (⅒ mm) or less.

When high low-temperature usability of asphalt waterproof sheets, a low viscosity of the composition for asphalt waterproof sheets, and high construction workability are required, a softening agent is preferably added to the composition. The softening agent used is preferably an oil, more preferably a process oil, from the viewpoint of large effects.

If necessary, an inorganic filler may be used.

Examples of the method for constructing an asphalt waterproof sheet include, but are not limited to, a heat method, a torch-applied method, a self-adhesive method, and a combined machining method.

The composition for asphalt waterproof sheets containing the polymer of the present embodiment has high heat aging resistance and as such, can also be suitably used in the heat method or the torch-applied method.

The method for producing the asphalt composition of the present embodiment is not particularly limited, and any method heretofore known in the art can be appropriately used.

Conditions for stirring the mixture of the polymer and the asphalt are not particularly limited, and the stirring is carried out at a temperature of preferably 160° C. or higher and 200° C. or lower (typically, around 180° C.), for a stirring time of preferably 30 minutes to 6 hours, more preferably 2 to 3 hours.

The stirring speed can be appropriately selected according to the apparatus used and is usually 100 rpm or higher and 8,000 rpm or lower.

EXAMPLES

Hereinafter, the present invention will be described specifically with reference to Examples. However, the present invention is not intended to be limited by these Examples by any means.

Measurement methods for polymers and asphalt compositions in Examples and Comparative Examples are as described below.

[Measurement Method]

<Content of Vinyl Aromatic Monomer Unit (Styrene Content) in Polymer>

A given amount of each polymer was dissolved in chloroform and assayed using an ultraviolet spectrophotometer (manufactured by Shimadzu Corp., UV-2450). The content of the vinyl aromatic monomer units (styrene) was calculated using a calibration curve from the peak intensity of an absorption wavelength (262 nm) attributed to the vinyl aromatic compound (styrene).

<Content of Polymer Block (A) in Polymer>

The content of the polymer block (A) was measured by the osmium tetroxide method described in I. M. Kolthoff, et al., J. Polym. Sci. 1, p. 429 (1946) using each polymer before hydrogenation.

A solution of 0.1 g of osmic acid in 125 mL of tertiary butanol was used in the decomposition of the polymer.

<Vinyl Bond Content in Polymer and Rate of Hydrogenation of Double Bond in Conjugated Diene Monomer Unit>

The vinyl bond content in each polymer and the rate of hydrogenation of double bonds in the conjugated diene monomer units were measured by nuclear magnetic resonance spectrum analysis (NMR) under conditions given below.

Both of the vinyl bond content and the rate of hydrogenation were measured using a polymer sample after hydrogenation reaction. The polymer after hydrogenation was precipitated and recovered by the addition of a large amount of methanol to the reaction solution after hydrogenation reaction.

Subsequently, the polymer after hydrogenation was extracted with acetone, and the extract was dried in vacuum and used as a sample for 1H-NMR measurement.

The conditions for the 1H-NMR measurement will be described below.

(Measurement Conditions)

Measurement apparatus: JNM-LA400 (manufactured by JEOL Ltd.)

Solvent: deuterated chloroform

Measurement sample: polymer extracts obtained before and after hydrogenation

Sample concentration: 50 mg/mL

Observation frequency: 400 MHz

Chemical shift standard: TMS (tetramethylsilane)

Pulse delay: 2.904 seconds

The number of scans: 64

Pulse width: 45°

Measurement temperature: 26° C.

<Dynamic Viscoelastic Spectrum>

The loss tangent (tan δ) was determined by the measurement of a viscoelastic spectrum using a viscoelastic measurement analyzer ARES (trade name; manufactured by TA Instruments Japan Inc.). A sample for measurement was loaded in a twisted-type geometry and assayed at a strain of 0.5% and a measurement frequency of 1 Hz.

In this way, the peak height of the loss tangent (tan δ) and the temperature at which the peak existed were measured.

<Weight-Average Molecular Weight and Molecular Weight Distribution>

The weight-average molecular weight (Mw) and molecular weight distribution (Mw/Mn) of each polymer were measured by GPC [apparatus: manufactured by Waters Corp.].

The solvent used was tetrahydrofuran, and the measurement was carried out at a temperature of 35° C.

The weight-average molecular weight (polystyrene-based molecular weight) and the number-average molecular weight were determined by checking a molecular weight at a peak of a chromatogram against a calibration curve determined from the measurement of commercially available standard polystyrenes (prepared using the peak molecular weights of the standard polystyrenes). The molecular weight distribution was determined from the ratio between the obtained weight-average molecular weight and number-average molecular weight.

<Content of short-chain vinyl aromatic monomer-polymerized moiety (short-chain styrene content)>

Oxygen having a ($O_3$) concentration of 1.5% was allowed to pass at a rate of 150 mL/min through a dichloromethane solution of each polymer for oxidative decomposition. The obtained ozonide was reduced by dropwise addition into diethyl ether mixed with lithium aluminum hydride.

Next, the resulting product was hydrolyzed by the addition of pure water and salted-out by the addition of potassium carbonate, followed by filtration to obtain a vinyl aromatic hydrocarbon component.

This vinyl aromatic hydrocarbon component was assayed by GPC.

The area ratio of the peak thus obtained (peak area corresponding to the short-chain vinyl aromatic monomer-polymerized moiety/total area of the peak) was calculated to obtain the content of the short-chain vinyl aromatic monomer-polymerized moiety based on 100% by mass of the vinyl aromatic monomer units in the polymer block (B) contained in the polymer.

The ozone generator used was model OT-31R-2 manufactured by Nippon Ozone Generator Co., Ltd., and the GPC measurement was carried out at a flow rate of 1.0 mL/min and a column oven temperature of 35° C. by using 2487 manufactured by Waters Corp., chloroform as a solvent, and two columns (Shodex column-K803L) connected.

<Bragg Spacing>

The Bragg spacing of each polymer was measured using a nanoscale X-ray structural evaluation apparatus NANO-Viewer [apparatus: manufactured by Rigaku Corp.] and PILATUS 100K (two-dimensional semiconductor detector).

The two-dimensional SAXS pattern obtained in PILATUS 100K was corrected for background and blank cell scattering. Then, the circular average was obtained to determine a one-dimensional scattering profile.

The primary peak position (2θm) of scattering derived from a microphase separation structure was read out from the one-dimensional scattering profile, and the interdomain space d, i.e., Bragg spacing, was calculated according to the Bragg equation (1):

$$d=\lambda/2/\sin(\theta m) \quad (1)$$

θm: Bragg angle at the primary peak position of scattering

<Method for Calculating X, Y, and Z>

The rate of hydrogenation is represented by H, and the vinyl bond content is represented by V.

X is indicated by X=V when H≥V and X=H when H<V.

Y is indicated by H−V provided that Y is absent when H≤V.

Z is indicated by 100−H.

[Method for Producing Polymer]

(Preparation of Hydrogenation Catalyst)

A reaction vessel purged with nitrogen was charged with 2 L of dried and purified cyclohexane. After dissolution of 40 mmol of bis(η5-cyclopentadienyl)titanium di-(p-tolyl) and 150 g of 1,2-polybutadiene (1,2-vinyl bond content: approximately 85%) having a molecular weight of approximately 1,000, a cyclohexane solution containing 60 mmol of n-butyllithium was added thereto, and the mixture was reacted at room temperature for 5 minutes. Immediately thereafter, 40 mmol of n-butanol was added thereto, and the mixture was stirred and stored at room temperature.

(Polymer 1)

Polymerization was carried out by the following method using a vessel-type reactor (internal volume: 10 L) with a stirrer and a jacket.

The reactor was charged with 10 parts by mass of cyclohexane. After temperature adjustment to 70° C., 0.12% by mass of n-butyllithium based on the mass of all monomers (total amount of butadiene monomers and styrene monomers added to the reactor) and 0.4 mol of N,N,N',N'-tetramethylethylenediamine (hereinafter, referred to as TMEDA) based on 1 mol of n-butyllithium were added to the reactor. Then, a cyclohexane solution containing 10 parts by mass of styrene as monomers (monomer concentration: 22% by mass) was added thereto over approximately 3 minutes, and the mixture was reacted for 30 minutes while the internal temperature of the reactor was adjusted to approximately 70° C.

Next, a cyclohexane solution containing 59 parts by mass of butadiene (monomer concentration: 22% by mass) and a cyclohexane solution containing 21 parts by mass of styrene (monomer concentration: 22% by mass) were continuously supplied to the reactor at a constant rate over 20 minutes and 10 minutes, respectively. The specific energy (value obtained by dividing stirring power by the amount of the reaction solution in the polymerization vessel) was adjusted to 0.30 kw/m³, and the internal pressure of the reactor was set to 0.30 MPa, followed by reaction for 30 minutes. During this operation, the internal temperature of the reactor was adjusted to approximately 70° C.

Then, a cyclohexane solution containing 10 parts by mass of styrene as monomers (monomer concentration: 22% by mass) was further added thereto over approximately 3 minutes, and the mixture was reacted for 30 minutes while the internal temperature of the reactor was adjusted to approximately 70° C. and the internal pressure of the reactor was adjusted to 0.30 MPa to obtain a polymer.

Next, the hydrogenation catalyst described above was added at 90 ppm (in terms of titanium) based on the mass of the polymer to the obtained polymer, and hydrogenation reaction was carried out at a hydrogen pressure of 0.7 MPa and a temperature of 65° C. After the completion of the reaction, methanol was added to the polymer, and 0.3% by mass of octadecyl-3-(3,5-di-t-butyl-4-hydroxyphenyl) propionate based on the mass of the polymer was then added thereto as a stabilizer to obtain a hydrogenated polymer. The rate of hydrogenation was 83%.

(Polymer 2)

The amount of styrene supplied at the first stage was changed to 11 parts by mass; the amounts of butadiene and styrene supplied at the second stage were changed to 55 parts by mass and 23 parts by mass, respectively; the duration of time required for the completion of addition of butadiene was changed to 30 minutes; and the amount of styrene supplied at the third stage was changed to 11 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 95 ppm (in terms of titanium) based on the mass of the polymer to the obtained polymer.

The rate of hydrogenation was 89%.

(Polymer 3)

The amount of n-butyllithium supplied was changed to 0.125% by mass; the amount of styrene supplied at the first stage was changed to 12 parts by mass; the amounts of butadiene and styrene supplied at the second stage were changed to 63 parts by mass and 14 parts by mass, respectively; and the amount of styrene supplied at the third stage was changed to 11 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 85 ppm (in terms of titanium) based on the mass of the polymer to the obtained polymer.

The rate of hydrogenation was 66%.

(Polymer 4)

The amount of n-butyllithium supplied was changed to 0.115% by mass; the amount of styrene supplied at the first stage was changed to 15 parts by mass; the amounts of butadiene and styrene supplied at the second stage were changed to 51 parts by mass and 19 parts by mass, respectively; the duration of time required for the completion of addition of butadiene was changed to 35 minutes; the specific energy was adjusted to 0.38 kw/m³, and the internal temperature of the reactor was adjusted to 75° C.; and the amount of styrene supplied at the third stage was changed to 15 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 65 ppm (in terms of titanium) based on the mass of the polymer to the obtained polymer.

The rate of hydrogenation was 34%.

(Polymer 5)

The amount of styrene supplied at the first stage was changed to 10 parts by mass; the amounts of butadiene and styrene supplied at the second stage were changed to 56 parts by mass and 25 parts by mass, respectively; the duration of time required for the completion of addition of butadiene was changed to 30 minutes; and the amount of styrene supplied at the third stage was changed to 9 parts by mass. Polymerization was carried out in the same way as in the polymer 1 except for the above.

Polymer 5 was obtained without hydrogenation reaction.

The rate of hydrogenation was 0%.

(Polymer 6)

The amount of styrene supplied at the first stage was changed to 11 parts by mass; the amounts of butadiene and styrene supplied at the second stage were changed to 59 parts by mass and 20 parts by mass, respectively; the duration of time required for the completion of addition of butadiene was changed to 30 minutes; and the amount of styrene supplied at the third stage was changed to 10 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 95 ppm (in terms of titanium) based on the mass of the polymer to the obtained polymer.

The rate of hydrogenation was 85%.

(Polymer 7)

The amount of n-butyllithium supplied was changed to 0.095% by mass; the amount of styrene supplied at the first stage was changed to 9 parts by mass; the amounts of butadiene and styrene supplied at the second stage were changed to 60 parts by mass and 22 parts by mass, respectively; the duration of time required for the completion of addition of butadiene was changed to 30 minutes; the specific energy was adjusted to 0.44 kw/m$^3$; and the amount of styrene supplied at the third stage was changed to 9 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 95 ppm (in terms of titanium) based on the mass of the polymer to the obtained polymer.

The rate of hydrogenation was 85%.

(Polymer 8)

The amount of n-butyllithium supplied was changed to 0.080% by mass; the amount of styrene supplied at the first stage was changed to 11 parts by mass; the amounts of butadiene and styrene supplied at the second stage were changed to 59 parts by mass and 20 parts by mass, respectively; the duration of time required for the completion of addition of butadiene was changed to 28 minutes; the specific energy was adjusted to 0.46 kw/m$^3$; and the amount of styrene supplied at the third stage was changed to 10 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 90 ppm (in terms of titanium) based on the mass of the polymer to the obtained polymer.

The rate of hydrogenation was 80%.

(Polymer 9)

The amount of n-butyllithium supplied was changed to 0.115% by mass; the amount of styrene supplied at the first stage was changed to 11 parts by mass; the amounts of butadiene and styrene supplied at the second stage were changed to 58 parts by mass and 21 parts by mass, respectively; and the duration of time required for the completion of addition of butadiene was changed to 30 minutes. Polymerization was carried out in the same way as in the polymer 1 except for the above.

Then, 1,3-dimethyl-2-imidazolidinone was added at 0.95 mol based on 1 mol of n-butyllithium, and the mixture was reacted for 25 minutes.

Next, a hydrogenated polymer was obtained through the same hydrogenation reaction as in the polymer 1 except that the hydrogenation catalyst described above was added at 90 ppm (in terms of titanium) based on the mass of the polymer to the obtained polymer.

The rate of hydrogenation was 84%.

(Polymer 10)

The amount of n-butyllithium supplied was changed to 0.095% by mass; the amount of styrene supplied at the first stage was changed to 11 parts by mass; the amounts of butadiene and styrene supplied at the second stage were changed to 58 parts by mass and 21 parts by mass, respectively; and the duration of time required for the completion of addition of butadiene was changed to 30 minutes. Polymerization was carried out in the same way as in the polymer 1 except for the above.

Next, a hydrogenated polymer was obtained through the same hydrogenation reaction as in the polymer 1 except that the hydrogenation catalyst described above was added at 80 ppm (in terms of titanium) based on the mass of the polymer to the obtained polymer.

The rate of hydrogenation was 64%.

(Polymer 11)

The amount of n-butyllithium supplied was changed to 0.125% by mass; the amount of styrene supplied at the first stage was changed to 23 parts by mass; the amounts of butadiene and styrene supplied at the second stage were changed to 50 parts by mass and 5 parts by mass, respectively; the duration of time required for the completion of addition of butadiene was changed to 30 minutes; and the amount of styrene supplied at the third stage was changed to 22 parts by mass. Polymerization was carried out in the same way as in the polymer 1 except for the above.

Next, the obtained polymer was subjected to the same hydrogenation reaction as in the polymer 1 to obtain a hydrogenated polymer.

The rate of hydrogenation was 84%.

(Polymer 12)

Polymerization was carried out in the same way as in the polymer 1 except that: the amount of styrene supplied at the first stage was changed to 9 parts by mass; the amounts of butadiene and styrene supplied at the second stage were changed to 60 parts by mass and 22 parts by mass, respectively; the duration of time required for the completion of addition of butadiene was changed to 8 minutes; the amount of styrene supplied at the third stage was changed to 9 parts by mass; and the specific energy was adjusted to 0.42 kw/m$^3$.

Next, a hydrogenated polymer was obtained through the same hydrogenation reaction as in the polymer 1 except that the hydrogenation catalyst described above was added at 85 ppm (in terms of titanium) based on the mass of the polymer to the obtained polymer.

The rate of hydrogenation was 75%.

(Polymer 13)

The amount of styrene supplied at the first stage was changed to 13 parts by mass; the amounts of butadiene and styrene supplied at the second stage were changed to 52 parts by mass and 22 parts by mass, respectively; the duration of time required for the completion of addition of butadiene was changed to 30 minutes; the internal temperature of the reactor was adjusted to 75° C.; and the amount of styrene supplied at the third stage was changed to 13 parts by mass. Polymerization was carried out in the same way as in the polymer 1 except for the above.

Next, a hydrogenated polymer was obtained through the same hydrogenation reaction as in the polymer 1 except that the hydrogenation catalyst described above was added at 100 ppm (in terms of titanium) based on the mass of the polymer to the obtained polymer.

The rate of hydrogenation was 96%.

(Polymer 14)

A polymer was obtained in the same way as in the polymer 1 by changing the amounts of monomers, etc., supplied to the reactor.

The amount of n-butyllithium supplied was changed to 0.13% by mass; the amounts of butadiene and styrene supplied at the second stage were changed to 50 parts by mass and 30 parts by mass, respectively; the duration of time required for the completion of addition of butadiene was changed to 40 minutes; the internal temperature of the reactor was adjusted to 85° C., and the internal pressure of the reactor was adjusted to 0.42 MPa; and the specific energy was adjusted to 0.35 kw/m³. Polymerization was carried out in the same way as in the polymer 1 except for the above.

Next, a hydrogenated polymer was obtained through the same hydrogenation reaction as in the polymer 1 except that the hydrogenation catalyst described above was added at 85 ppm (in terms of titanium) based on the mass of the polymer to the obtained polymer.

The rate of hydrogenation was 70%.

(Polymer 15)

The amount of n-butyllithium supplied was changed to 0.125% by mass; the amount of styrene supplied at the first stage was changed to 20 parts by mass; the amount of butadiene supplied at the second stage was changed to 61 parts by mass, while styrene was not added at the second stage; and the amount of styrene supplied at the third stage was changed to 19 parts by mass. Polymerization was carried out in the same way as in the polymer 1 except for the above.

Polymer 15 was obtained without hydrogenation reaction.

The rate of hydrogenation was 0%.

(Polymer 16)

A vessel-type reactor with a jacket was used. The reactor was charged with a predetermined amount of cyclohexane, and the internal temperature of the reactor was adjusted to 60° C.

Then, 0.12 parts by mass of n-butyllithium based on 100 parts by mass of all monomers (total amount of butadiene monomers and styrene monomers added to the reactor) were added from the bottom of the reactor.

0.40 mol of a cyclohexane solution of N,N,N',N'-tetramethylethylenediamine based on 1 mol of n-butyllithium was further added thereto.

Then, for polymerization reaction in the first step, a cyclohexane solution containing 10 parts by mass of styrene as monomers (monomer concentration: 15% by mass) was supplied thereto over approximately 10 minutes, and the internal temperature of the reactor was adjusted to 65° C.

After the completion of the supply, the mixture was reacted for 15 minutes.

Next, for polymerization reaction in the second step, a cyclohexane solution containing 57 parts by mass of butadiene (monomer concentration: 15% by mass) and a cyclohexane solution containing 23 parts by mass of styrene (monomer concentration: 15% by mass) were each continuously supplied to the reactor at a constant rate over 60 minutes. The specific energy was adjusted to 0.30 kw/m³, and the internal pressure of the reactor was set to 0.30 MPa, followed by reaction. After the completion of the supply, the mixture was reacted for 15 minutes.

Next, for polymerization reaction in the third step, a cyclohexane solution containing 10 parts by mass of styrene (monomer concentration: 15% by mass) was supplied to the reactor over approximately 10 minutes, and the internal temperature of the reactor was adjusted to 65° C. After the completion of the supply, the mixture was reacted for 15 minutes.

Next, the hydrogenation catalyst described above was added at 100 ppm (in terms of titanium) based on the mass of the polymer to the obtained polymer, and hydrogenation reaction was carried out at a hydrogen pressure of 0.7 MPa and a temperature of 65° C.

After the completion of the reaction, an aqueous methanol solution was added to the polymer, and 0.1% by mass of octadecyl-3-(3,5-di-t-butyl-4-hydroxyphenyl) propionate based on the mass of the polymer was then added thereto as a stabilizer.

(Polymer 17)

0.085 parts by mass of n-butyllithium based on 100 parts by mass of all monomers (total amount of butadiene monomers and styrene monomers added to the reactor) were added from the bottom of the reactor; the polymerization temperature was set to 55° C.; the first step was carried out by using a cyclohexane solution containing 11 parts by mass of styrene (monomer concentration: 15% by mass); the second step was carried out by using a cyclohexane solution containing 58 parts by mass of butadiene (monomer concentration: 15% by mass) and a cyclohexane solution containing 20 parts by mass of styrene (monomer concentration: 15% by mass), and adjusting the specific energy to 0.35 kw/m³; the third step was carried out by using a cyclohexane solution containing 11 parts by mass of styrene (monomer concentration: 15% by mass); and the hydrogenation catalyst was added at 95 ppm. Polymerization was carried out in the same way as in the polymer 16 except for the above.

(Polymer 18)

0.125 parts by mass of n-butyllithium based on 100 parts by mass of all monomers (total amount of butadiene monomers and styrene monomers added to the reactor) were added from the bottom of the reactor; the polymerization temperature was set to 65° C.; the first step was carried out by using a cyclohexane solution containing 11 parts by mass of styrene (monomer concentration: 15% by mass); the second step was carried out by using a cyclohexane solution containing 45 parts by mass of butadiene (monomer concentration: 15% by mass) and a cyclohexane solution containing 33 parts by mass of styrene (monomer concentration: 15% by mass), and adjusting the specific energy to 0.25 kw/m³; and the third step was carried out by using a cyclohexane solution containing 11 parts by mass of styrene (monomer concentration: 15% by mass). Polymerization was carried out in the same way as in the polymer 16 except for the above.

(Polymer 19)

0.115 parts by mass of n-butyllithium based on 100 parts by mass of all monomers (total amount of butadiene monomers and styrene monomers added to the reactor) were added from the bottom of the reactor; the polymerization temperature was set to 65° C.; the first step was carried out by using a cyclohexane solution containing 18 parts by mass of styrene (monomer concentration: 15% by mass); the second step was carried out by using a cyclohexane solution containing 50 parts by mass of butadiene (monomer concentration: 15% by mass) and a cyclohexane solution containing 14 parts by mass of styrene (monomer concentration: 15% by mass), and adjusting the specific energy to 0.32 kw/m$^3$; and the third step was carried out by using a cyclohexane solution containing 18 parts by mass of styrene (monomer concentration: 15% by mass). Polymerization was carried out in the same way as in the polymer 16 except for the above.

(Polymer 20)

0.125 parts by mass of n-butyllithium based on 100 parts by mass of all monomers (total amount of butadiene monomers and styrene monomers added to the reactor) were added from the bottom of the reactor; the polymerization temperature was set to 65° C.; the first step was carried out by using a cyclohexane solution containing 11 parts by mass of styrene (monomer concentration: 20% by mass); the second step was carried out by supplying a cyclohexane solution containing 57 parts by mass of butadiene (monomer concentration: 20% by mass) and a cyclohexane solution containing 21 parts by mass of styrene (monomer concentration: 20% by mass) in 3 portions each at 5-minute intervals, and adjusting the specific energy to 0.32 kw/m$^3$; and the third step was carried out by using a cyclohexane solution containing 11 parts by mass of styrene (monomer concentration: 20% by mass). Polymerization was carried out in the same way as in the polymer 16 except for the above.

(Polymer 21)

The first step was carried out by using a cyclohexane solution containing 10 parts by mass of styrene (monomer concentration: 25% by mass); the second step was carried out by adding a cyclohexane solution containing 60 parts by mass of butadiene (monomer concentration: 25% by mass) and a cyclohexane solution containing 21 parts by mass of styrene (monomer concentration: 25% by mass) over 10 minutes each, and adjusting the specific energy to 0.32 kw/m$^3$; and the third step was carried out by using a cyclohexane solution containing 9 parts by mass of styrene (monomer concentration: 25% by mass). Polymerization was carried out in the same way as in the polymer 16 except for the above.

(Polymer 22)

0.125 parts by mass of n-butyllithium based on 100 parts by mass of all monomers (total amount of butadiene monomers and styrene monomers added to the reactor) were added from the bottom of the reactor; the polymerization temperature was set to 56° C.; the first step was carried out by using a cyclohexane solution containing 11 parts by mass of styrene (monomer concentration: 15% by mass); the second step was carried out by continuously supplying a cyclohexane solution containing 57 parts by mass of butadiene (monomer concentration: 15% by mass) and a cyclohexane solution containing 21 parts by mass of styrene (monomer concentration: 15% by mass) to the reactor at a constant rate over 55 minutes each, and adjusting the specific energy to 0.32 kw/m$^3$ and the internal pressure of the reactor to 0.25 MPa, followed by reaction; and the third step was carried out by using a cyclohexane solution containing 11 parts by mass of styrene (monomer concentration: 15% by mass). Polymerization was carried out in the same way as in the polymer 16 except for the above.

(Polymer 23)

0.085 parts by mass of n-butyllithium based on 100 parts by mass of all monomers (total amount of butadiene monomers and styrene monomers added to the reactor) were added from the bottom of the reactor; the polymerization temperature was set to 50° C.; the first step was carried out by using a cyclohexane solution containing 17 parts by mass of styrene (monomer concentration: 15% by mass) and setting the internal temperature of the reactor to 53° C.; the second step was carried out by continuously supplying a cyclohexane solution containing 43 parts by mass of butadiene (monomer concentration: 15% by mass) and a cyclohexane solution containing 24 parts by mass of styrene (monomer concentration: 15% by mass) to the reactor at a constant rate over 55 minutes each, and adjusting the specific energy to 0.42 kw/m$^3$ and the internal pressure of the reactor to 0.15 MPa, followed by reaction; and the third step was carried out by using a cyclohexane solution containing 16 parts by mass of styrene (monomer concentration: 15% by mass). Polymerization was carried out in the same way as in the polymer 16 except for the above.

(Polymer 24)

0.100 parts by mass of n-butyllithium based on 100 parts by mass of all monomers (total amount of butadiene monomers and styrene monomers added to the reactor) were added from the bottom of the reactor; the polymerization temperature was set to 57° C.; and the second step was carried out by continuously supplying a cyclohexane solution containing 60 parts by mass of butadiene (monomer concentration: 15% by mass) and a cyclohexane solution containing 20 parts by mass of styrene (monomer concentration: 15% by mass) to the reactor at a constant rate over 57 minutes each, and adjusting the specific energy to 0.42 kw/m$^3$. Polymerization was carried out in the same way as in the polymer 16 except for the above.

(Polymer 25)

0.080 parts by mass of n-butyllithium based on 100 parts by mass of all monomers (total amount of butadiene monomers and styrene monomers added to the reactor) were added from the bottom of the reactor; the polymerization temperature was set to 56° C.; and the second step was carried out by continuously supplying a cyclohexane solution containing 60 parts by mass of butadiene (monomer concentration: 15% by mass) and a cyclohexane solution containing 20 parts by mass of styrene (monomer concentration: 15% by mass) to the reactor at a constant rate over 59 minutes each, and adjusting the specific energy to 0.46 kw/m$^3$. Polymerization was carried out in the same way as in the polymer 16 except for the above.

(Polymer 26)

0.085 parts by mass of n-butyllithium based on 100 parts by mass of all monomers (total amount of butadiene monomers and styrene monomers added to the reactor) were added from the bottom of the reactor; the polymerization temperature was set to 55° C.; the first step was carried out by using a cyclohexane solution containing 11 parts by mass of styrene (monomer concentration: 15% by mass); and the polymerization in the second step was carried out by using a cyclohexane solution containing 59 parts by mass of butadiene (monomer concentration: 15% by mass) and a cyclohexane solution containing 20 parts by mass of styrene (monomer concentration: 15% by mass), and adjusting the specific energy to 0.35 kw/m³.

Then, 0.95 mol of 1,3-dimethyl-2-imidazolidinone based on 1 mol of n-butyllithium was added to the reactor, and the mixture was reacted for 25 minutes.

Next, the hydrogenation catalyst was added at 95 ppm to the obtained polymer. Polymerization was carried out in the same way as in the polymer 16 except for the above.

(Polymer 27)

0.130 parts by mass of n-butyllithium based on 100 parts by mass of all monomers (total amount of butadiene monomers and styrene monomers added to the reactor) were added from the bottom of the reactor; the polymerization temperature was set to 85° C.; the first step was carried out by using a cyclohexane solution containing 8 parts by mass of styrene (monomer concentration: 15% by mass); the second step was carried out by continuously supplying a cyclohexane solution containing 50 parts by mass of butadiene (monomer concentration: 15% by mass) and a cyclohexane solution containing 35 parts by mass of styrene (monomer concentration: 15% by mass) to the reactor at a constant rate over 60 minutes each, and adjusting the specific energy to 0.08 kw/m³ and the internal pressure of the reactor to 0.32 MPa, followed by reaction; and the third step was carried out by using a cyclohexane solution containing 7 parts by mass of styrene (monomer concentration: 15% by mass). Polymerization was carried out in the same way as in the polymer 16 except for the above.

(Polymer 28)

0.140 parts by mass of n-butyllithium based on 100 parts by mass of all monomers (total amount of butadiene monomers and styrene monomers added to the reactor) were added from the bottom of the reactor; the polymerization temperature was set to 56° C.; the first step was carried out by using a cyclohexane solution containing 11 parts by mass of styrene (monomer concentration: 15% by mass); the second step was carried out by continuously supplying a cyclohexane solution containing 59 parts by mass of butadiene (monomer concentration: 15% by mass) and a cyclohexane solution containing 19 parts by mass of styrene (monomer concentration: 15% by mass) to the reactor at a constant rate over 55 minutes each, and adjusting the specific energy to 0.09 kw/m³ and the internal pressure of the reactor to 0.25 MPa, followed by reaction; and the third step was carried out by using a cyclohexane solution containing 11 parts by mass of styrene (monomer concentration: 15% by mass). Polymerization was carried out in the same way as in the polymer 16 except for the above.

(Polymer 29)

0.080 parts by mass of n-butyllithium based on 100 parts by mass of all monomers (total amount of butadiene monomers and styrene monomers added to the reactor) were added from the bottom of the reactor; the polymerization temperature was set to 55° C.; the first step was carried out by using a cyclohexane solution containing 10 parts by mass of styrene (monomer concentration: 15% by mass); the second step was carried out by using a cyclohexane solution containing 57 parts by mass of butadiene (monomer concentration: 15% by mass) and a cyclohexane solution containing 24 parts by mass of styrene (monomer concentration: 15% by mass), and adjusting the specific energy to 0.35 kw/m³; the third step was carried out by using a cyclohexane solution containing 9 parts by mass of styrene (monomer concentration: 15% by mass); and the hydrogenation catalyst was added at 85 ppm. Polymerization was carried out in the same way as in the polymer 16 except for the above.

(Polymer 30)

0.085 parts by mass of n-butyllithium based on 100 parts by mass of all monomers (total amount of butadiene monomers and styrene monomers added to the reactor) were added from the bottom of the reactor; the polymerization temperature was set to 55° C.; the first step was carried out by using a cyclohexane solution containing 11 parts by mass of styrene (monomer concentration: 15% by mass); the second step was carried out by using a cyclohexane solution containing 58 parts by mass of butadiene (monomer concentration: 15% by mass) and a cyclohexane solution containing 20 parts by mass of styrene (monomer concentration: 15% by mass), and adjusting the specific energy to 0.39 kw/m³; the third step was carried out by using a cyclohexane solution containing 11 parts by mass of styrene (monomer concentration: 15% by mass); and hydrogenation reaction was not carried out. Polymerization was carried out in the same way as in the polymer 16 except for the above.

(Polymer 31)

The first step was carried out by using a cyclohexane solution containing 17 parts by mass of styrene (monomer concentration: 15% by mass); the second step was carried out by continuously supplying a cyclohexane solution containing 67 parts by mass of butadiene (monomer concentration: 15% by mass) to the reactor at a constant rate over 60 minutes, and performing the reaction for 15 minutes after the completion of the supply; the third step was carried out by using a cyclohexane solution containing 16 parts by mass of styrene (monomer concentration: 15% by mass); and hydrogenation reaction was not carried out. Polymerization was carried out in the same way as in the polymer 16 except for the above.

TABLE 1

| | Styrene content (mass %) | Content of polymer block (A) (mass %) | Rate of hydrogenation (mol %) | Vinyl bond content (mol %) | Mw (ten thousand) | Mw/Mn | tan δ peak height/temperature (° C.) | X/Y/Z | Bragg spacing (nm) | Short-chain vinyl content (mass %) |
|---|---|---|---|---|---|---|---|---|---|---|
| Polymer 1 | 41 | 20 | 83 | 32 | 18 | 1.1 | 0.9/−35 | 32/51/17 | 35.9 | 94 |
| Polymer 2 | 45 | 22 | 89 | 29 | 18 | 1.1 | 1.1/−32 | 29/60/11 | 35.1 | 93 |
| Polymer 3 | 37 | 23 | 66 | 26 | 17 | 1.1 | 0.8/−40 | 26/40/34 | 36.4 | 71 |
| Polymer 4 | 49 | 30 | 34 | 33 | 19 | 1.1 | 1.3/−40 | 33/1/66 | 37.3 | 62 |
| Polymer 5 | 44 | 19 | 0 | 30 | 18 | 1.1 | 1.0/−30 | 0/0/100 | 38.2 | 90 |
| Polymer 6 | 41 | 21 | 85 | 32 | 18 | 1.1 | 1.2/−34 | 32/53/15 | 35.8 | 93 |
| Polymer 7 | 40 | 18 | 85 | 31 | 23 | 1.1 | 1.0/−31 | 31/54/15 | 44.2 | 90 |
| Polymer 8 | 41 | 21 | 80 | 30 | 26 | 1.1 | 0.9/−30 | 30/50/20 | 49.0 | 91 |
| Polymer 9 | 42 | 21 | 84 | 30 | 19 | 1.1 | 0.9/−35 | 30/54/16 | 36.4 | 92 |
| Polymer 10 | 42 | 21 | 64 | 28 | 23 | 1.1 | 0.9/−9 | 28/36/36 | 37.6 | 91 |
| Polymer 11 | 50 | 45 | 84 | 33 | 17 | 1.1 | 0.7/−43 | 33/51/16 | 35.7 | 93 |
| Polymer 12 | 40 | 18 | 75 | 20 | 18 | 1.1 | 0.5/−36 | 20/55/25 | 38.6 | 45 |

TABLE 1-continued

|  | Styrene content (mass %) | Content of polymer block (A) (mass %) | Rate of hydrogenation (mol %) | Vinyl bond content (mol %) | Mw (ten thousand) | Mw/Mn | tan δ peak height/temperature (° C.) | X/Y/Z | Bragg spacing (nm) | Short-chain vinyl content (mass %) |
|---|---|---|---|---|---|---|---|---|---|---|
| Polymer 13 | 48 | 26 | 96 | 30 | 18 | 1.1 | 1.2/−30 | 30/66/4 | 33.3 | 87 |
| Polymer 14 | 50 | 20 | 70 | 37 | 16 | 1.1 | 1.7/−30 | 37/33/30 | 36.5 | 90 |
| Polymer 15 | 39 | 39 | 0 | 21 | 17 | 1.1 | 0.1 or lower/−80 | 0/0/100 | 37.4 | 0 |

TABLE 2

|  | Styrene content (mass %) | Content of polymer block (A) (mass %) | Rate of hydrogenation (mol %) | Vinyl bond content (mol %) | Mw (ten thousand) | Mw/Mn | tan δ peak height/temperature (° C.) | X/Y/Z | Bragg spacing (nm) | Short-chain vinyl content (mass %) |
|---|---|---|---|---|---|---|---|---|---|---|
| Polymer 16 | 43 | 20 | 99 | 27 | 18 | 1.1 | 1.2/−31 | 27/72/1 | 32.9 | 90 |
| Polymer 17 | 42 | 22 | 91 | 28 | 25 | 1.1 | 1.2/−33 | 28/63/9 | 35.8 | 91 |
| Polymer 18 | 55 | 22 | 96 | 28 | 17 | 1.1 | 1.3/−15 | 28/68/4 | 30.0 | 87 |
| Polymer 19 | 50 | 36 | 97 | 27 | 19 | 1.1 | 1.2/−41 | 27/70/3 | 34.0 | 92 |
| Polymer 20 | 43 | 22 | 99 | 29 | 17 | 1.1 | 1.2/−37 | 29/70/1 | 34.8 | 75 |
| Polymer 21 | 40 | 19 | 95 | 30 | 18 | 1.1 | 1.1/−43 | 30/65/5 | 35.0 | 47 |
| Polymer 22 | 43 | 22 | 95 | 30 | 17 | 1.1 | 0.7/−32 | 30/65/5 | 34.4 | 80 |
| Polymer 23 | 57 | 33 | 98 | 33 | 25 | 1.1 | 0.6/−16 | 33/65/2 | 38.6 | 68 |
| Polymer 24 | 40 | 20 | 97 | 29 | 22 | 1.1 | 0.9/−29 | 29/68/3 | 43.0 | 90 |
| Polymer 25 | 40 | 20 | 97 | 28 | 26 | 1.1 | 1.0/−28 | 28/69/3 | 49.2 | 91 |
| Polymer 26 | 41 | 21 | 92 | 30 | 25 | 1.1 | 1.2/−31 | 30/62/8 | 35.3 | 89 |
| Polymer 27 | 50 | 15 | 98 | 28 | 16 | 1.1 | 1.7/−13 | 28/70/2 | 26.0 | 93 |
| Polymer 28 | 41 | 22 | 98 | 28 | 14 | 1.1 | 0.7/−30 | 28/70/2 | 26.7 | 83 |
| Polymer 29 | 43 | 19 | 77 | 27 | 26 | 1.1 | 1.2/−31 | 27/50/23 | 36.0 | 88 |
| Polymer 30 | 42 | 22 | 0 | 30 | 25 | 1.1 | 1.1/−35 | 0/0/100 | 36.8 | 93 |
| Polymer 31 | 33 | 33 | 0 | 17 | 18 | 1.1 | 0.1 or lower | 0/0/100 | 37.7 | 0 |

[Production of Asphalt Composition]

In Examples 1 to 36 and Comparative Examples 1 to 5, each asphalt composition was produced by the following procedures.

500 g of straight asphalt 60-80 (manufactured by Nippon Oil Corp.) was added to a 750 mL metal can, and the metal can was fully immersed in an oil bath of 180° C.

Next, 3.5 parts by mass or 8 parts by mass of the polymer produced as mentioned above based on 100 parts by mass of the asphalt in a melted state were added thereto in small portions with stirring.

After the completion of the addition, the mixture was stirred at a rotation speed of 6000 rpm for 90 minutes to prepare an asphalt composition.

In the polymer addition step mentioned above, polymer 1 and SBS were added at a mixing ratio of 40 parts by mass/60 parts by mass. Then, the mixture was stirred for 180 minutes to produce asphalt compositions of Examples 10 and 11.

Also, polymer 1 and SBS were added at a mixing ratio of 60 parts by mass/40 parts by mass. Then, production was carried out in the same way as in Examples 10 and 11 to produce an asphalt composition of Example 12.

Furthermore, polymer 17 and SBS were added at a mixing ratio of 40 parts by mass/60 parts by mass. Then, production was carried out in the same way as in Examples 10 and 11 described above to produce asphalt compositions of Examples 29 and 30.

Furthermore, polymer 17 and SBS were added at a mixing ratio of 60 parts by mass/40 parts by mass. Then, production was carried out in the same way as in Examples 10 and 11 described above to produce an asphalt composition of Example 31.

The following SBS was used in Examples 10 to 12 and 29 to 31.

Examples 10 and 29: Kraton D1184, which is a radial polymer having a styrene content of 30%, a diblock content of 14.5%, and a polystyrene-based weight-average molecular weight of 400000.

Examples 11, 12, 30, and 31: Kraton D1101, which is a linear polymer having a styrene content of 31%, a diblock content of 17.0%, and a polystyrene-based weight-average molecular weight of 180000.

In the polymer addition step mentioned above, 3.5 parts by mass of polymer 10 based on 100 parts by mass of the asphalt were added in small amounts with stirring. After the completion of the addition, the mixture was stirred at a rotation speed of 6000 rpm for 90 minutes. Then, 0.2 parts by mass of sulfur were added thereto, and the mixture was further stirred for 60 minutes to prepare an asphalt composition of Example 13.

[Preparation of Mixture for Road Pavement]

The asphalt composition obtained in each of Examples 1 to 33 and Comparative Examples 1 to 4 and an aggregate were mixed (total amount of the mixture: 10 kg) using a 27 L experimental mixer equipped with a heating apparatus to obtain an asphalt mixture for road pavement as a dense graded mixture.

Specifically, the aggregate used had crushed stone No. 6/crushed stone No. 7/crushed sand/fine sand/stone dust mixing ratio of 36/19/27/12/6(%), and 5.5 parts by mass of the asphalt composition and 94.5 parts by mass of the aggregate were mixed. In other words, the content of the asphalt composition was set to 5.5% by mass in the mixture for road pavement.

The aggregate used was crushed stone and crushed sand from Iwafune-cho, Shimotsuga-gun, Tochigi, Japan, fine sand from Sakae-cho, Inba-gun, Chiba, Japan, and stone dust from Yamasuge-cho, Sano, Tochigi, Japan.

The particle size distribution of the aggregate used in the production of the asphalt mixture is shown in Table 3 below.

TABLE 3

| Aggregate | | Percent weight passing (%) |
|---|---|---|
| Sieve mesh (mm) | 19 | 100 |
| | 13.2 | 99.6 |
| | 4.75 | 64.2 |
| | 2.36 | 43.1 |
| | 0.6 | 27 |
| | 0.3 | 19.7 |
| | 0.15 | 9.9 |
| | 0.075 | 6.1 |
| Amount of asphalt composition (mass %) | | 5.5 |

The mixing of the asphalt composition and the aggregate was carried out by the following procedures.

First, 94.5 parts by mass of the dense graded aggregate having a predetermined particle size were added to the mixer and dry-mixed for 25 seconds. Subsequently, 5.5 parts by mass of the asphalt composition obtained in each of Examples 1 to 33 and Comparative Examples 1 to 4 were added to the mixer and finally mixed with the aggregate for 50 seconds to obtain a dense graded mixture for road pavement.

The mixing temperature was 177° C. for both of the dry mixing and the final mixing.

[Physical Property of Asphalt Composition]

The physical properties of each asphalt composition were measured by the methods given below.

The measurement results are shown in Tables 4 to 6 below.

(Softening Point (Ring & Ball Method))

The softening point of the asphalt composition was measured according to JIS-K 2207.

A defined ring was filled with a sample of the asphalt composition and horizontally supported in a glycerin solution. A ball of 3.5 g was placed at the center of the sample, and the temperature of the solution was raised at a rate of 5° C./min. The temperature at which the sample came into contact with the bottom plate of a ring base by the weight of the ball was measured.

(Melt Viscosity)

The melt viscosity was measured at 160° C. using a Brookfield viscometer.

(Penetration)

The penetration was determined according to JIS-K 2207 by measuring the length of penetration of a defined needle for 5 seconds into the sample kept at 25° C. in a constant-temperature water bath.

(Elongation)

The elongation was determined according to JIS-K 2207. The sample was poured into a form, made into a defined shape, and then kept at 15° C. in a constant-temperature water bath. Next, the sample was pulled at a rate of 5 cm/min. The distance of elongation of the sample until the sample broke was measured.

(High-Temperature Storage Stability (Variation in Softening Point))

Immediately after production of the asphalt composition, the asphalt composition was heated for 3 days in an oven of 180° C. Then, the metal can was removed, and the softening point was measured. The difference between the softening point immediately after the production and the softening point after the heating for 3 days was used as an index for the high-temperature storage stability. A smaller difference between the softening points means better high-temperature storage stability.

(Dissolution Time)

The average particle size of the polymer was measured during the production of the asphalt composition, and the time required for the polymer to reach a predetermined size was measured as a dissolution time.

In the measurement method, the polymer was observed using transmitted light under a digital microscope.

The measurement apparatus and the measurement conditions were as follows.

Measurement apparatus: digital microscope VHX-2000 manufactured by Keyence Corp.

Measurement Conditions

Measurement temperature: 25° C.

Magnification: ×1000

Measurement mode: transmitted light

Sample adjustment method: 10 mg of the asphalt composition during stirring was collected onto a glass slide, which was then left standing for 20 seconds on a hot plate heated to 180° C. for melting. Then, a glass cover was placed on the melted asphalt composition to thinly spread the asphalt composition. The asphalt composition was left at room temperature for 30 minutes and then observed under a digital microscope. The time in the production when the dispersed particle size reached 10 μm was defined as the dissolution time. A shorter time means better solubility.

(Workability)

A dense graded mixture was produced according to the above paragraph [Preparation of mixture for road pavement] and evaluated for easy leveling for construction.

Easier leveling means better performance. The sample was rated as ⊚, ◯, and X in order from better to poorer outcomes.

⊚: Easily leveled

◯: Fair

X: Difficult to level due to lost flowability (Low-Temperature Elongation)

The elongation of an asphalt composition containing 3.5% by mass of each of polymers 1 to 33 produced by the method described above, or an asphalt composition containing 3.5% by mass in total of polymer 1 or polymer 17 and SBS in each of Examples 10 to 12 and 29 to 31 was measured according to JIS-K 2207.

An asphalt sample having a defined shape was pulled at a rate of 5 cm/min in water of 5° C. The length (cm) of elongation of the sample until the sample broke was measured.

A higher value means higher low-temperature performance. The sample was rated as ◯, Δ, and X in order from better to poorer outcomes.

◯: 20 cm or more

Δ: 10 cm or more

X: less than 10 cm (Recovery after Tension)

The asphalt composition produced by the method described above was poured into a dedicated jig to produce a sample for measurement.

The sample was pulled at a rate of 5 cm/min in a water bath of 25° C., and the pulling was terminated when the sample elongated by 20 cm. The sample was left standing for 5 minutes and then cut at the center.

Then, the cut sample was left in a water bath for 60 minutes. The degree of recovery of the sample for measurement based on the original length was measured.

Higher recovery after tension means better performance. The sample was rated as ⊚, ○, Δ, and X in order from better to poorer outcomes.

⊚: 80% or more
○: 75% or more and less than 80%
Δ: 70% or more and less than 75%
X: less than 70%

(Heat Aging Resistance of Polymer)

An asphalt composition containing 3.5% by mass of the polymer produced by the method described above was stored at 190° C. and sampled after a lapse of predetermined time. Change in the molecular weight distribution of the polymer was analyzed by GPC. Based on this change, the polymer was evaluated for its heat aging resistance.

The peak height of the polymer obtained in GPC was lowered due to the thermal degradation of the polymer.

Smaller change from the peak height of the polymer before storage means higher heat aging resistance and better performance.

The sample was evaluated on the basis of the number of days required for change in height to reach 30% or more and rated as ○, Δ, and X in order from better to poorer outcomes. Only the sample rated as ○ was confirmed to have practically sufficient performance.

○: 2 days or later
Δ: 1 day or later and less than 2 days
X: less than 1 day.

(Resistance to Aggregate Spalling)

A dense graded asphalt mixture was produced in the same way as in the above paragraph [Preparation of mixture for road pavement].

This asphalt mixture was placed as a specimen in a Los Angeles tester for Marshall stability and subjected to 300 drum rotations without the use of a steel ball. After the test, the amount of loss (resistance to aggregate spalling) was measured.

Lower resistance to aggregate spalling means better performance. The sample was rated as ⊚, ○, Δ, and X in order from better to poorer outcomes.

⊚: less than 20%
○: 20% or more and less than 23%
Δ: 23% or more and less than 26%
X: 26% or more (Dynamic Stability)

A dense graded asphalt mixture was produced in the same way as in the above paragraph [Preparation of mixture for road pavement] and assayed for its dynamic stability according to B003 of the Test Methods Handbook from Japan Road Association.

A loaded small wheel with a rubber tire was repetitively shuttled at a defined speed at a defined temperature for a defined time on a sample for evaluation having a predetermined size. The dynamic stability (pass/mm) was determined from the amount of deformation per unit time.

A higher value means higher rutting resistance. The sample was rated as ⊚, ○, Δ, and X in order from better to poorer outcomes.

⊚: 20000 passes/mm or more
○: 10000 passes/mm or more
Δ: 5000 passes/mm or more
X: less than 5000 passes/mm

TABLE 4

| | | Example 1 Polymer 1 | Example 2 Polymer 2 | Example 3 Polymer 3 | Example 4 Polymer 4 | Example 5 Polymer 5 | Example 6 Polymer 6 | Example 7 Polymer 7 | Example 8 Polymer 8 | Example 9 Polymer 9 | Example 10 Polymer 1 + SBS |
|---|---|---|---|---|---|---|---|---|---|---|---|
| | Asphalt | | | | | Straight asphalt 60-80 | | | | | |
| Physical properties | Softening point (° C.) | 67 | 70 | 63 | 67 | 66 | 68 | 68 | 73 | 66 | 68 |
| | Melt viscosity (mPa·s) (160° C.) | 422 | 441 | 401 | 407 | 395 | 431 | 460 | 470 | 411 | 439 |
| | Penetration (1/10 mm) | 44 | 41 | 46 | 42 | 44 | 43 | 41 | 41 | 45 | 46 |
| | Elongation (cm) (15° C.) | 70 | 66 | 77 | 75 | 78 | 69 | 80 | 83 | 74 | 74 |
| | High-temperature storage stability (° C.) | 2 | 2 | 3 | 3 | 5 | 2 | 2 | 2 | 2 | 4 |
| | Dissolution time (h) | 0.5 | 0.75 | 0.5 | 0.5 | 1 | 0.5 | 1 | 1.5 | 0.5 | 1 |
| | Workability | ⊚ | ⊚ | ⊚ | ⊚ | ⊚ | ⊚ | ○ | ○ | ⊚ | ⊚ |
| | Low-temperature elongation (cm) (5° C.) | Δ | X | Δ | Δ | Δ | Δ | Δ | ○ | Δ | ○ |
| | Recovery after tension | ⊚ | ⊚ | ○ | Δ | X | ⊚ | ⊚ | ○ | ⊚ | ⊚ |
| | Heat aging resistance | Δ | Δ | Δ | Δ | X | Δ | Δ | Δ | Δ | X |
| | Resistance to aggregate spalling (10° C.) | Δ | ○ | Δ | Δ | X | ○ | ○ | Δ | ○ | Δ |
| | Dynamic stability (pass/mm) | ○ | ○ | Δ | Δ | X | ○ | ○ | ○ | ⊚ | ○ |

| | | Example 11 Polymer 1 + SBS | Example 12 Polymer 1 + SBS | Example 13 Polymer 10 + sulfur | Example 14 Polymer 11 | Example 15 Polymer 12 | Example 16 Polymer 13 | Example 17 Polymer 14 | Example 18 Polymer 16 | Example 19 Polymer 17 | Example 20 Polymer 18 |
|---|---|---|---|---|---|---|---|---|---|---|---|
| | Asphalt | | | | | Straight asphalt 60-80 | | | | | |
| Physical properties | Softening point (° C.) | 64 | 66 | 68 | 72 | 66 | 72 | 62 | 68 | 72 | 67 |
| | Melt viscosity (mPa·s) (160° C.) | 416 | 420 | 433 | 496 | 411 | 534 | 481 | 544 | 622 | 613 |
| | Penetration (1/10 mm) | 46 | 45 | 44 | 37 | 44 | 35 | 40 | 34 | 36 | 33 |
| | Elongation (cm) (15° C.) | 71 | 70 | 67 | 59 | 70 | 52 | 62 | 55 | 70 | 52 |
| | High-temperature storage stability (° C.) | 4 | 3 | 2 | 3 | 3 | 3 | 3 | 2 | 3 | 2 |
| | Dissolution time (h) | 1 | 1 | 0.75 | 4.5 | 3 | 2 | 2 | 2 | 2 | 2 |
| | Workability | ⊚ | ⊚ | ⊚ | ⊚ | ○ | ⊚ | ⊚ | ⊚ | ⊚ | ○ |

TABLE 4-continued

|  |  |  |  |  |  |  |  |  |  |  |
|---|---|---|---|---|---|---|---|---|---|---|
|  | Low-temperature elongation (cm) (5° C.) | ○ | ○ | △ | △ | △ | X | △ | X | △ | X |
|  | Recovery after tension | ◎ | ○ | ○ | △ | △ | ◎ | △ | ◎ | ◎ | △ |
|  | Heat aging resistance | X | X | X | △ | △ | ○ | X | ○ | ○ | ○ |
|  | Resistance to aggregate spalling (10° C.) | △ | △ | ○ | △ | X | ○ | X | ◎ | ○ | ○ |
|  | Dynamic stability (pass/mm) | △ | △ | ◎ | △ | △ | ○ | △ | ○ | ○ | ○ |

TABLE 5

|  |  | Example 21 Polymer 19 | Example 22 Polymer 20 | Example 23 Polymer 21 | Example 24 Polymer 22 | Example 25 Polymer 23 | Example 26 Polymer 24 | Example 27 Polymer 25 | Example 28 Polymer 26 | Example 29 Polymer 17 + SBS | Example 30 Polymer 17 + SBS |
|---|---|---|---|---|---|---|---|---|---|---|---|
|  | Asphalt | Straight asphalt 60-80 | | | | | | | | | |
| Physical properties | Softening point (° C.) | 68 | 69 | 68 | 70 | 73 | 71 | 70 | 70 | 73 | 70 |
|  | Melt viscosity (mPa·s) (160° C.) | 606 | 588 | 535 | 560 | 667 | 571 | 603 | 531 | 644 | 571 |
|  | Penetration (1/10 mm) | 35 | 34 | 35 | 35 | 32 | 35 | 35 | 36 | 36 | 36 |
|  | Elongation (cm) (15° C.) | 56 | 52 | 55 | 54 | 67 | 66 | 71 | 77 | 72 | 69 |
|  | High-temperature storage stability (° C.) | 2 | 2 | 3 | 3 | 2 | 2 | 2 | 2 | 4 | 4 |
|  | Dissolution time (h) | 1.5 | 1.5 | 1.5 | 1.5 | 4 | 2 | 2.5 | 2 | 3 | 3 |
|  | Workability | ○ | ◎ | ◎ | ◎ | ○ | ○ | ○ | ◎ | ◎ | ◎ |
|  | Low-temperature elongation (cm) (5° C.) | X | X | △ | X | △ | X | X | ○ | ○ | ○ |
|  | Recovery after tension | △ | ○ | ○ | ○ | X | ○ | ○ | ◎ | ◎ | ○ |
|  | Heat aging resistance | ○ | ○ | ○ | ○ | ○ | ○ | ○ | ○ | ○ | ○ |
|  | Resistance to aggregate spalling (10° C.) | ○ | ○ | △ | △ | X | ○ | △ | ◎ | ○ | ○ |
|  | Dynamic stability (pass/mm) | ○ | ○ | △ | ○ | △ | ○ | ○ | ◎ | ○ | ○ |

|  |  | Example 31 Polymer 17 + SBS | Example 32 Polymer 29 | Example 33 Polymer 30 | Comparative Example 1 Polymer 15 | Comparative Example 2 Polymer 27 | Comparative Example 3 Polymer 28 | Comparative Example 4 Polymer 31 |
|---|---|---|---|---|---|---|---|---|
|  | Asphalt | Straight asphalt 60-80 | | | | | | |
| Physical properties | Softening point (° C.) | 71 | 67 | 67 | 54 | 59 | 59 | 52 |
|  | Melt viscosity (mPa·s) (160° C.) | 599 | 388 | 422 | 351 | 582 | 522 | 366 |
|  | Penetration (1/10 mm) | 36 | 43 | 44 | 49 | 35 | 35 | 50 |
|  | Elongation (cm) (15° C.) | 70 | 75 | 82 | 92 | 53 | 55 | 96 |
|  | High-temperature storage stability (° C.) | 4 | 3 | 5 | 8 | 3 | 2 | 9 |
|  | Dissolution time (h) | 3 | 2 | 4 | 5 | 3.5 | 3 | 5.5 |
|  | Workability | ◎ | ◎ | ◎ | ◎ | X | X | ◎ |
|  | Low-temperature elongation (cm) (5° C.) | ○ | △ | △ | △ | X | X | ○ |
|  | Recovery after tension | ◎ | ◎ | X | X | ○ | ○ | X |
|  | Heat aging resistance | ○ | △ | X | X | ○ | ○ | X |
|  | Resistance to aggregate spalling (10° C.) | ○ | X | X | X | X | X | X |
|  | Dynamic stability (pass/mm) | ○ | △ | X | ○ | ○ | ○ | ○ |

TABLE 6

| Component |  | Example 34 Polymer 1 | Example 35 Polymer 5 | Example 36 Polymer 13 | Comparative Example 5 Polymer 15 |
|---|---|---|---|---|---|
|  | Asphalt | Straight asphalt 60-80 | | | |
| Physical properties | Softening point (° C.) | 95 | 90 | 105 | 86 |
|  | Melt viscosity (mPa·s) (160° C.) | 1905 | 1814 | 2233 | 1775 |
|  | Penetration (1/10 mm) | 30 | 32 | 28 | 36 |
|  | Elongation (cm) (15° C.) | 49 | 53 | 46 | 58 |
|  | Dissolution time (h) | 1.5 | 3 | 8 | 20 |

The present application is based on Japanese Patent Application No. 2014-007293 filed with the Japanese Patent Office on Jan. 17, 2014, Japanese Patent Application No. 2014-085364 filed with the Japanese Patent Office on Apr. 17, 2014, Japanese Patent Application No. 2014-203037 filed with the Japanese Patent Office on Oct. 1, 2014, Japanese Patent Application No. 2014-203038 filed with the Japanese Patent Office on Oct. 1, 2014, Japanese Patent Application No. 2014-232736 filed with the Japanese Patent Office on Nov. 17, 2014, and Japanese Patent Application No. 2014-232737 filed with the Japanese Patent Office on Nov. 17, 2014, the contents of which are incorporated herein by reference in their entirety.

INDUSTRIAL APPLICABILITY

The asphalt composition comprising the polymer of the present invention can be used in the fields of road pavement, roofings or waterproof sheets, and sealants and can be particularly suitably used in the field of road pavement.

The invention claimed is:

1. A polymer comprising a conjugated diene monomer unit and a vinyl aromatic monomer unit, wherein
the polymer has a polymer block (A) comprising principally a vinyl aromatic monomer unit, and a polymer block (B) comprising a conjugated diene monomer unit and a vinyl aromatic monomer unit,
the polymer has a Bragg spacing of 27 nm or larger and 50 nm or smaller,
the polymer has a peak top of loss tangent (tan $\delta$) in the range of −55 to −10° C. in a dynamic viscoelastic spectrum,
the polymer has a functional group, and
a value of the peak top is 0.7 or higher and 1.5 or lower.

2. The polymer according to claim 1, wherein a rate of hydrogenation of a double bond in the conjugated diene monomer unit is 0 mol % or higher and 90 mol % or lower.

3. The polymer according to claim 1, wherein the rate of hydrogenation of the double bond in the conjugated diene monomer unit is 50 mol % or higher and 90 mol % or lower.

4. The polymer according to claim 1, wherein the rate of hydrogenation of the double bond in the conjugated diene monomer unit exceeds 90 mol %.

5. The polymer according to claim 1, wherein
the value of the peak top is 0.8 or higher and 1.3 or lower.

6. The polymer according to claim 5, wherein
the value of the peak top is 0.9 or higher and 1.2 or lower.

7. The polymer according to claim 1, wherein a content of the vinyl aromatic monomer unit is 20% by mass or larger and 60% by mass or smaller.

8. The polymer according to claim 1, wherein the content of the polymer block (A) is 10% by mass or larger and 40% by mass or smaller.

9. The polymer according to claim 1, wherein the content of a short-chain vinyl aromatic monomer-polymerized moiety comprising 2 to 6 vinyl aromatic monomer units in the polymer block (B) is 50% by mass or larger based on the content of the vinyl aromatic monomer unit in the polymer block (B) defined as 100% by mass.

10. The polymer according to claim 9, wherein a content of a short-chain vinyl aromatic monomer-polymerized moiety in the polymer block (B) is 70% by mass or larger based on the content of the vinyl aromatic monomer unit in the polymer block (B) defined as 100% by mass.

11. The polymer according to claim 1, wherein
the conjugated diene monomer unit consist of a conjugated diene monomer unit (a) derived from 1,2-bond and/or 3,4-bond and a conjugated diene monomer unit (b) derived from 1,4-bond, and
when a total content of the conjugated diene monomer unit is defined as 100% by mass,
a content of an alkenyl monomer unit (a1) of a hydrogenated part of the conjugated diene monomer unit (a) is 10% by mass or larger and 50% by mass or smaller,
a content of an alkenyl monomer unit (b1) of a hydrogenated part of the conjugated diene monomer unit (b) is 0% by mass or larger and 80% by mass or smaller, and
the sum of the contents of an unhydrogenated conjugated diene monomer unit (a) and an unhydrogenated conjugated diene monomer unit (b) after hydrogenation is 0% by mass or larger and 90% by mass or smaller.

12. The polymer according to claim 1, wherein the polymer has a weight-average molecular weight of 50000 or higher and 400000 or lower.

13. The polymer according to claim 1, wherein the content of the conjugated diene monomer unit (a) derived from 1,2-bond and/or 3,4-bond is 10 mol % or higher and 50 mol % or lower based on the total content of the conjugated diene monomer unit.

14. An asphalt composition comprising 0.5 parts by mass or more and 50 parts by mass or less of the polymer according to claim 1 and 100 parts by mass of asphalt.

15. An asphalt composition comprising
0.5 parts by mass or more and 50 parts by mass or less in total of the polymer according to claim 1 and a block copolymer ($\alpha$), and
100 parts by mass of asphalt, wherein
the block copolymer ($\alpha$) has at least one polymer block (A) comprising principally a vinyl aromatic monomer unit, and at least one polymer block (C) comprising principally a conjugated diene monomer unit, and
a content of the block copolymer ($\alpha$) is 15 to 85% by mass in the total amount of the polymer and the block copolymer ($\alpha$).

16. The asphalt composition according to claim 14, further comprising 0.03 parts by mass or more and 3 parts by mass or less of sulfur and/or a sulfur compound based on 100 parts by mass of the asphalt.

17. The asphalt composition according to claim 15, further comprising 0.03 parts by mass or more and 3 parts by mass or less of sulfur and/or a sulfur compound based on 100 parts by mass of the asphalt.

18. An asphalt composition comprising 0.5 parts by mass or more and 50 parts by mass or less of the polymer according to claim 1 and 100 parts by mass of asphalt.

19. An asphalt composition comprising
0.5 parts by mass or more and 50 parts by mass or less in total of the polymer according to claim 1 and a block copolymer ($\alpha$), and
100 parts by mass of asphalt, wherein
the block copolymer ($\alpha$) has at least one polymer block (A) comprising principally a vinyl aromatic monomer unit, and at least one polymer block (C) comprising principally a conjugated diene monomer unit, and
a content of the block copolymer ($\alpha$) is 15 to 85% by mass in the total amount of the polymer and the block copolymer ($\alpha$).

* * * * *